(12) United States Patent
Vavrasek

(10) Patent No.: US 10,552,914 B2
(45) Date of Patent: *Feb. 4, 2020

(54) METHOD AND APPARATUS FOR EVALUATING RISK BASED ON SENSOR MONITORING

(71) Applicant: SENSORMATIC ELECTRONICS, LLC, Boca Raton, FL (US)

(72) Inventor: David Vavrasek, Westfield, NJ (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 635 days.

This patent is subject to a terminal disclaimer.

(21) Appl. No.: 15/147,093

(22) Filed: May 5, 2016

(65) Prior Publication Data

US 2017/0323389 A1 Nov. 9, 2017

(51) Int. Cl.
| | |
|---|---|
| *G06Q 40/00* | (2012.01) |
| *G06Q 40/08* | (2012.01) |
| *H04W 4/70* | (2018.01) |
| *G06N 20/00* | (2019.01) |
| *G08B 13/24* | (2006.01) |
| *H04L 29/06* | (2006.01) |

(52) U.S. Cl.
CPC .............. *G06Q 40/08* (2013.01); *G06N 20/00* (2019.01); *G08B 13/2491* (2013.01); *H04L 63/0428* (2013.01); *H04W 4/70* (2018.02)

(58) Field of Classification Search
CPC ......... G06Q 40/08; H04W 4/70; G06N 20/00; G08B 13/2491; H04L 63/0428
USPC ................................................. 705/4, 35–40
See application file for complete search history.

(56) References Cited

U.S. PATENT DOCUMENTS

| | | | |
|---|---|---|---|
| 5,453,733 | A | 9/1995 | Peterson et al. |
| 5,587,704 | A | 12/1996 | Foster |
| 5,708,423 | A | 1/1998 | Ghaffari et al. |
| 5,825,283 | A | 10/1998 | Camhi |

(Continued)

FOREIGN PATENT DOCUMENTS

| | | |
|---|---|---|
| EP | 1 921 527 | 5/2008 |
| EP | 1921572 | 5/2008 |

(Continued)

OTHER PUBLICATIONS

Fuchs et al: "Fire Monitoring—The Use of Medium Resolution Satellites . . . for Long Time Series Processing . . . ", 36th International Symposium on Remote Sensing of Environment, Berlin, Germany, May 11-15, 2015 (Year: 2015).*

(Continued)

*Primary Examiner* — Edward J Baird
(74) *Attorney, Agent, or Firm* — Foley & Lardner LLP

(57) ABSTRACT

Described are techniques for determining a quotation score that would be applicable across lines of insurance and/or carriers, and which involves the collection in real time of sensor information from plural groups of sensors deployed in a specific premises and associated with intrusion detection, access control, burglar, fire alarm systems and surveillance systems and/or other systems that monitor for physical/chemical/biological conditions. The techniques execute unsupervised learning models to continually analyze the collected sensor information to produce sequences of state transitions that are assign scores and from which a quotation score is produced.

20 Claims, 12 Drawing Sheets

(56) References Cited

U.S. PATENT DOCUMENTS

| | | | |
|---|---|---|---|
| 5,862,201 A | 1/1999 | Sands | |
| 8,650,048 B1* | 2/2014 | Hopkins, III | G06Q 40/08 705/4 |
| 9,609,003 B1* | 3/2017 | Chmielewski | G06F 16/954 |
| 9,852,475 B1 | 12/2017 | Konrardy et al. | |
| 9,996,078 B1 | 6/2018 | Wu et al. | |
| 10,296,979 B2 | 5/2019 | Trainor et al. | |
| 10,354,332 B2* | 7/2019 | Trainor | |
| 10,374,821 B2 | 8/2019 | Ansari et al. | |
| 2001/0039525 A1 | 11/2001 | Messmer et al. | |
| 2002/0067259 A1 | 6/2002 | Fufidio et al. | |
| 2002/0161609 A1 | 10/2002 | Zizzamia et al. | |
| 2003/0083756 A1 | 5/2003 | Hsiung et al. | |
| 2003/0109951 A1 | 6/2003 | Hsiung et al. | |
| 2003/0117279 A1 | 6/2003 | Ueno et al. | |
| 2003/0136135 A1 | 7/2003 | Kim et al. | |
| 2003/0144746 A1 | 7/2003 | Hsiung et al. | |
| 2003/0144932 A1 | 7/2003 | Martin et al. | |
| 2004/0150519 A1 | 8/2004 | Husain et al. | |
| 2005/0055249 A1 | 3/2005 | Helitzer et al. | |
| 2005/0068165 A1 | 3/2005 | Kelliher et al. | |
| 2005/0110637 A1 | 5/2005 | Rao | |
| 2005/0184867 A1 | 8/2005 | Osann, Jr. | |
| 2005/0187860 A1* | 8/2005 | Peterson | G06Q 40/02 705/38 |
| 2006/0033625 A1 | 2/2006 | Johnson et al. | |
| 2006/0195569 A1 | 8/2006 | Barker | |
| 2006/0287783 A1 | 12/2006 | Walker | |
| 2007/0061023 A1 | 3/2007 | Hoffberg et al. | |
| 2007/0085690 A1 | 4/2007 | Tran | |
| 2007/0142936 A1 | 6/2007 | Denison et al. | |
| 2007/0282773 A1 | 12/2007 | Harrison et al. | |
| 2008/0065427 A1 | 3/2008 | Helitzer et al. | |
| 2008/0103751 A1 | 5/2008 | Hsiung et al. | |
| 2008/0294690 A1 | 11/2008 | McClellan et al. | |
| 2009/0002148 A1 | 1/2009 | Horvitz | |
| 2009/0022362 A1 | 1/2009 | Gagvani et al. | |
| 2009/0077167 A1 | 3/2009 | Baum et al. | |
| 2009/0265193 A1 | 10/2009 | Collins et al. | |
| 2009/0279734 A1 | 11/2009 | Brown | |
| 2010/0063954 A1* | 3/2010 | Anderson | G05D 1/0221 706/50 |
| 2010/0094661 A1 | 4/2010 | Karlinski et al. | |
| 2010/0115579 A1 | 5/2010 | Rensin et al. | |
| 2010/0134285 A1 | 6/2010 | Holmquist | |
| 2010/0153140 A1 | 6/2010 | Helitzer et al. | |
| 2010/0174566 A1* | 7/2010 | Helitzer | G06Q 40/08 705/4 |
| 2010/0183160 A1 | 7/2010 | Cosgrove et al. | |
| 2011/0307221 A1 | 12/2011 | Higgins et al. | |
| 2012/0086550 A1 | 4/2012 | Leblanc et al. | |
| 2012/0158161 A1 | 6/2012 | Cohn et al. | |
| 2012/0226652 A1 | 9/2012 | Gupta et al. | |
| 2013/0006676 A1 | 1/2013 | Helitzer et al. | |
| 2013/0027561 A1 | 1/2013 | Lee et al. | |
| 2013/0057405 A1 | 3/2013 | Seelman et al. | |
| 2013/0066592 A1 | 3/2013 | Aupetit et al. | |
| 2013/0091213 A1 | 4/2013 | Diab et al. | |
| 2013/0201316 A1 | 8/2013 | Binder et al. | |
| 2013/0218603 A1 | 8/2013 | Hagelstein et al. | |
| 2013/0307682 A1 | 11/2013 | Jerhotova et al. | |
| 2013/0335219 A1 | 12/2013 | Malkowski | |
| 2014/0005509 A1 | 1/2014 | Bhavaraju et al. | |
| 2014/0006060 A1 | 1/2014 | Sehnal et al. | |
| 2014/0132409 A1 | 5/2014 | Billman et al. | |
| 2014/0136242 A1 | 5/2014 | Weekes et al. | |
| 2014/0149416 A1 | 5/2014 | Wallace | |
| 2014/0247137 A1 | 9/2014 | Proud et al. | |
| 2014/0266592 A1 | 9/2014 | Dahl et al. | |
| 2014/0266684 A1 | 9/2014 | Poder et al. | |
| 2014/0277718 A1 | 9/2014 | Izhikevich et al. | |
| 2014/0278573 A1 | 9/2014 | Cook | |
| 2014/0279707 A1 | 9/2014 | Joshua et al. | |
| 2014/0313032 A1 | 10/2014 | Sager et al. | |
| 2014/0358840 A1 | 12/2014 | Tadic et al. | |
| 2015/0019266 A1* | 1/2015 | Stempora | G06Q 40/08 705/4 |
| 2015/0019267 A1 | 1/2015 | Prieto et al. | |
| 2015/0022357 A1 | 1/2015 | Gettings et al. | |
| 2015/0025917 A1 | 1/2015 | Stempora | |
| 2015/0077737 A1 | 3/2015 | Belinsky et al. | |
| 2015/0106927 A1* | 4/2015 | Ferragut | H04L 63/1416 726/23 |
| 2015/0120336 A1* | 4/2015 | Grokop | B60W 40/09 705/4 |
| 2015/0154715 A1 | 6/2015 | Wedig et al. | |
| 2015/0161882 A1 | 6/2015 | Lett | |
| 2015/0163121 A1 | 6/2015 | Mahaffey et al. | |
| 2015/0170505 A1 | 6/2015 | Frew et al. | |
| 2015/0187192 A1 | 7/2015 | Tabe | |
| 2015/0207796 A1* | 7/2015 | Love | H04L 63/10 600/345 |
| 2015/0233718 A1* | 8/2015 | Grokop | G01C 21/165 701/501 |
| 2015/0254330 A1 | 9/2015 | Chan et al. | |
| 2015/0254972 A1 | 9/2015 | Patterson et al. | |
| 2015/0364027 A1 | 12/2015 | Haupt et al. | |
| 2015/0375837 A1 | 12/2015 | Johnson et al. | |
| 2016/0003629 A1 | 1/2016 | Watanabe et al. | |
| 2016/0005130 A1 | 1/2016 | Devereaux et al. | |
| 2016/0029966 A1 | 2/2016 | Salas-Boni et al. | |
| 2016/0048580 A1 | 2/2016 | Raman | |
| 2016/0050264 A1 | 2/2016 | Breed et al. | |
| 2016/0072891 A1* | 3/2016 | Joshi | G06Q 30/0269 370/254 |
| 2016/0110833 A1 | 4/2016 | Fix et al. | |
| 2016/0163186 A1 | 6/2016 | Davidson et al. | |
| 2016/0171618 A1 | 6/2016 | Besman et al. | |
| 2016/0189510 A1 | 6/2016 | Hutz | |
| 2017/0004226 A1 | 1/2017 | Skoglund et al. | |
| 2017/0006135 A1 | 1/2017 | Siebel | |
| 2017/0011465 A1* | 1/2017 | Anastassov | G06Q 40/08 |
| 2017/0061783 A1 | 3/2017 | Nalukurthy et al. | |
| 2017/0091867 A1* | 3/2017 | Trainor | G06Q 40/08 |
| 2017/0091868 A1* | 3/2017 | Trainor | G06N 5/04 |
| 2017/0091869 A1* | 3/2017 | Trainor | G06N 5/04 |
| 2017/0091870 A1* | 3/2017 | Trainor | G08B 13/08 |
| 2017/0091871 A1* | 3/2017 | Trainor | G06Q 40/08 |
| 2017/0092108 A1 | 3/2017 | Trainor et al. | |
| 2017/0094376 A1* | 3/2017 | Trainor | H04Q 9/00 |
| 2017/0153914 A1 | 6/2017 | Rausch et al. | |
| 2017/0228661 A1 | 8/2017 | Chien et al. | |
| 2017/0299657 A1 | 10/2017 | Vinson et al. | |
| 2017/0301030 A1 | 10/2017 | Wedig et al. | |
| 2017/0308802 A1 | 10/2017 | Ramsoy et al. | |
| 2017/0351787 A1 | 12/2017 | Kapuschat et al. | |

FOREIGN PATENT DOCUMENTS

| | | | |
|---|---|---|---|
| EP | 2 843 636 A1 | 3/2015 | |
| JP | 09-011883 A | 1/1997 | |
| JP | 2009-274660 A | 11/2009 | |
| WO | WO-2014/125769 A1 | 8/2014 | |
| WO | WO-2017058993 A1 * | 4/2017 | G08B 13/08 |

OTHER PUBLICATIONS

International Search Report and Written Opinion, PCT/US2017/030345.

"Unsupervised Hierarchical Modeling of Driving Behavior and Prediction of Contextual Changing Points," IEEE Transactions on Intelligent Transportation Systems, vol. 16, No. 4, Aug. 2015, 35 pages.

An overview of concept drift applications—Einhoven University of Technology, The Netherlands by I Zliobaite—2016 URL: https://www.win.tue.nl/~mpechen/publications/pubs/CD_applications15.pdf, 18 pages.

CSC2515 Fall 2007 Introduction to Machine Learning, Lecture 10: Sequential Data Models, Fall 2007, 24 pages.

Datta, Somnath. "Learn More About Unsupervised Learning," Informatics for Materials Science and Engineering, 21 pages, 2013.

(56) References Cited

OTHER PUBLICATIONS

Gaussian process based modeling and experimental design for sensor calibration in drifting environments by Zngyu Geng, Feng Yang, 2015 URL: https://www.ncbi.nlm.nih.gov/pmc/articles/PMC4764506, 29 pages.
International Preliminary Report on Patentability on PCT/US2016/054311, dated Apr. 3, 2018, 12 pages.
International Preliminary Report on Patentability on PCT/US2017/022641, dated Sep. 18, 2018, 12 pages.
International Preliminary Report on Patentability on PCT/US2017/030345, dated Nov. 6, 2018, 10 pages.
International Preliminary Report on Patentability on PCT/US2017/035091, dated Dec. 20, 2018, 10 pages.
International Search Report & Written Opinion on PCT/US2015/019381, dated Jun. 19, 2015, 15 pages.
International Search Report & Written Opinion on PCT/US2016/054310, dated Dec. 15, 2016, 13 pages.
International Search Report and Written Opinion on PCT/US2016/054310, dated Dec. 15, 2016, 8 pages.
International Search Report and Written Opinion on PCT/US2016/054310, dated Dec. 19, 2016, 13 pages.
International Search Report and Written Opinion on PCT/US2016/054311, dated Dec. 13, 2016, 12 pages.
International Search Report and Written Opinion on PCT/US2016/054311, dated Dec. 13, 2016, 17 pages.
International Search Report and Written Opinion on PCT/US2016/054312, dated Dec. 9, 2016, 14 pages.
International Search Report and Written Opinion on PCT/US2016/054316, dated Feb. 7, 2017, 10 pages.
International Search Report and Written Opinion on PCT/US2016/054317, dated Dec. 19, 2016, 6 pages.
International Search Report and Written Opinion on PCT/US2016/054320, dated Dec. 19, 2016, 10 pages.
International Search Report and Written Opinion on PCT/US2016/054324, dated Dec. 29, 2016, 10 pages.
International Search Report and Written Opinion on PCT/US2017/022641, dated Apr. 13, 2017, 13 pages.
International search Report and Written Opinion on PCT/US2017/035091, dated Oct. 9, 2017, 10 pages.
International Search Report and Written Opinion on PCT/US2017/22641, dated Apr. 13, 2017, 11 pages.
International Search Report and Written Opinion on PCT/US2018/036699, dated Oct. 16, 2018, 17 pages.
International Search Report and Written Opinion, PCT/US2016/054317, dated Dec. 19, 2016, 9 pages.
Machine learning algorithms for Real Data Sources, Monteleoni, Feb. 2011. 46 pages.
Marxer [et al.,] "Unsupervised Incremental Learning and Prediction of Audio Signals," Proceedings of 20th International Symposium on Music Acoustics, 8 pages, Aug. 2010.
Rosenberg, Jerry M. Dictionary of Computers, Information Processing, and Telecommunications, 2 ed., John Wiley & Sons, 2 pages, 1990.
Statistical Learning Algorithms Applied to Automobile Insurance Ratemaking by Dugas et al, 37 pages.
Taniguchi [et al.,] "Semiotic Prediction of Driving Behavior using Unsupervised Double Articulation Analyzer," 2012 Intelligent Vehicles Symposium, 6 pages, Jun. 2012.
Unsupervised Learning by Ghahramani, Sep. 2004, 32 pages.
Supplementary European Search Report on EP 17767496.7, dated Oct. 25, 2019, 8 pages.

* cited by examiner

METHOD AND APPARATUS FOR EVALUATING RISK BASED ON SENSOR MONITORING

BACKGROUND

This description relates to operation of sensor networks such as those used for security, intrusion and alarm systems installed on industrial or commercial or residential premises in relation to insurance practices.

It is common for physical premises, especially, businesses to have various types of systems such as intrusion detection, fire detection and surveillance systems for detecting various alarm conditions at their premises and signaling the conditions to a monitoring station or authorized users. These systems use various types of sensors such as motion detectors, cameras, and proximity sensors, thermal, optical, vibration sensors and so forth. For processing of insurance coverage, currently customers receive one or more quotations from one or more insurance companies based on submission of specific pre-quotation characteristic information that is specified by the insurance company.

As used herein specific pre-quotation characteristic information refers to that information regarding specific and defined characteristics of specific objects or premises, as that information exists at the time of a request for a quotation for insurance for the specific objects or premises. The specific information that is supplied to an insurance company would depend on the type of insurance requested and the types of objects and premises. In this type of implementation, an insurance company analyzes the submitted specific pre-quotation characteristic information with respect to that company's own underwriting guidelines to generate a risk profile and a policy quote that is sent either to a user's device or as a quotation that is added to an intermediary website that furnishes quotations from numerous quoting insurance carriers.

SUMMARY

Policy quotations produced in this manner are one-time offers that are based on the submitted information and is only related to that particular customer rather than an aggregation of customers into a risk pool (which could provide a lower quote and lower risks to the insurance company).

Discussed below is a system that uses submitted specific pre-quotation characteristic information in addition to sensor data that is processed to form predictions in order to calculate a risk rating or score that is evaluated on its own or aggregated with scores from other consumers to allow the insurance companies to provide a more sophisticated analysis and competitive quote.

More specifically, the systems mines accumulated sensor data and geographically-related data to produce predictions with respect to a risk level that either equipment or a user's actions relative to the equipment pose to the premises and/or the equipment. These predictions are translated into rating scores.

According to an aspect, a computer program product tangibly stored on a computer readable hardware storage device, the computer program product for controlling operation of sensors at a physical premises, the computer program product including instructions to cause a processor to collect sensor information from plural groups of sensors deployed in a specific premises, execute one or more unsupervised learning models to continually analyze the collected sensor information to produce operational states, produce sequences of state transitions from the operational states of sensor information, assign scores to the produced sequences, determine from the assigned scores a quotation score, and store the sensor information with the determined quotation score in a persistent storage system.

Aspects also include systems and methods.

Additional features of the computer program product, systems and methods may include to these and other features.

The quotation score is encrypted using an encryption key. The quotation score is encrypted using an encryption key and received pre-quotation characteristic information from a user system which identifies a user and a premises for which the quotation score was determined are concatenated with the encrypted quotation score. Pre-quotation characteristic information and the quotation score are concatenated and are encrypted using an encryption key. A request to generate the quotation score is received from a requesting device. The collected sensor information is continually analyzed by the one or more unsupervised learning models to determine from the produced state sequences and quotation score, an updated quotation score. The received request is for a particular line of insurance and is determined from the particular line of insurance, factors and associated sensor data on which to apply the unsupervised learning models; and generate from results of executing the unsupervised machine learning models the quotation score for a particular line of insurance, where the quotation score is a measure of risk for a particular line of insurance.

When requesting quotations for casualty insurance, e.g., fire, theft, liability, etc. the information provided by the requestor in addition to identifying information includes is a unique real-time condition based risk rating or score that can be evaluated on its own or aggregated with other like risk ratings of other requestors to allow insurance companies to provide a more sophisticated analysis and competitive quote. The techniques involve a secure system where requestors self-publish independent third party determined risk scores that represents the level of risk of an insurable physical premises (facility) that allow insurance companies to quickly offer insurance products and quotes that reflect that score. These techniques can assist with developing a standardized method for generating these risk scores and an authentication method. Once published requestors could continually receive updated insurance quotes to make sure that they are always paying competitive insurance rates. Additionally, insurance companies can provide competitive quotes by grouping requestors with the same (or differing) scores in a way that maximizes the benefits to the requestor while minimizing risks to the insurance company.

The details of one or more embodiments of the invention are set forth in the accompanying drawings and the description below. Other features, objects, and advantages of the invention is apparent from the description and drawings, and from the claims.

DETAILED DESCRIPTION

Described herein are surveillance/intrusion/fire/access systems that are wirelessly connected to a variety of sensors. In some instances those systems may be wired to sensors. Examples of detectors/sensors 28 (sensor detectors used interchangeably) include motion detectors, glass break detectors, noxious gas sensors, smoke/fire detectors, contact/proximity switches, video sensors, such as camera, audio sensors such as microphones, directional microphones, temperature sensors such as infrared sensors, vibration sensors, air movement/pressure sensors, chemical/electro-chemical sensors, e.g., VOC (volatile organic compound) detectors. In some instances, those systems sensors may include weight sensors, LIDAR (technology that measures distance by illuminating a target with a laser and analyzing the reflected light), GPS (global positioning system) receivers, optical, biometric sensors, e.g., retina scan sensors, EGG/Heartbeat sensors in wearable computing garments, network hotspots and other network devices, and others.

The surveillance/intrusion/fire/access systems employ wireless sensor networks and wireless devices, with remote, cloud-based server monitoring and report generation. As described in more detail below, the wireless sensor networks wireless links between sensors and server computer systems, with the wireless links usually used for the lowest level connections (e.g., sensor node device to hub/gateway).

In the network, the edge (wirelessly-connected) tier of the network is comprised sensor devices that provide specific sensor functions. These sensor devices have a processor and memory, and may be battery operated and include a wireless network card. The edge devices generally form a single wireless network in which each end-node communicates directly with its parent node in a hub-and-spoke-style architecture. The parent node may be, e.g., a network access point (not to be confused with an access control device or system) on a gateway or a sub-coordinator which is, in turn is connected to the access point or another sub-coordinator.

Figure 1:
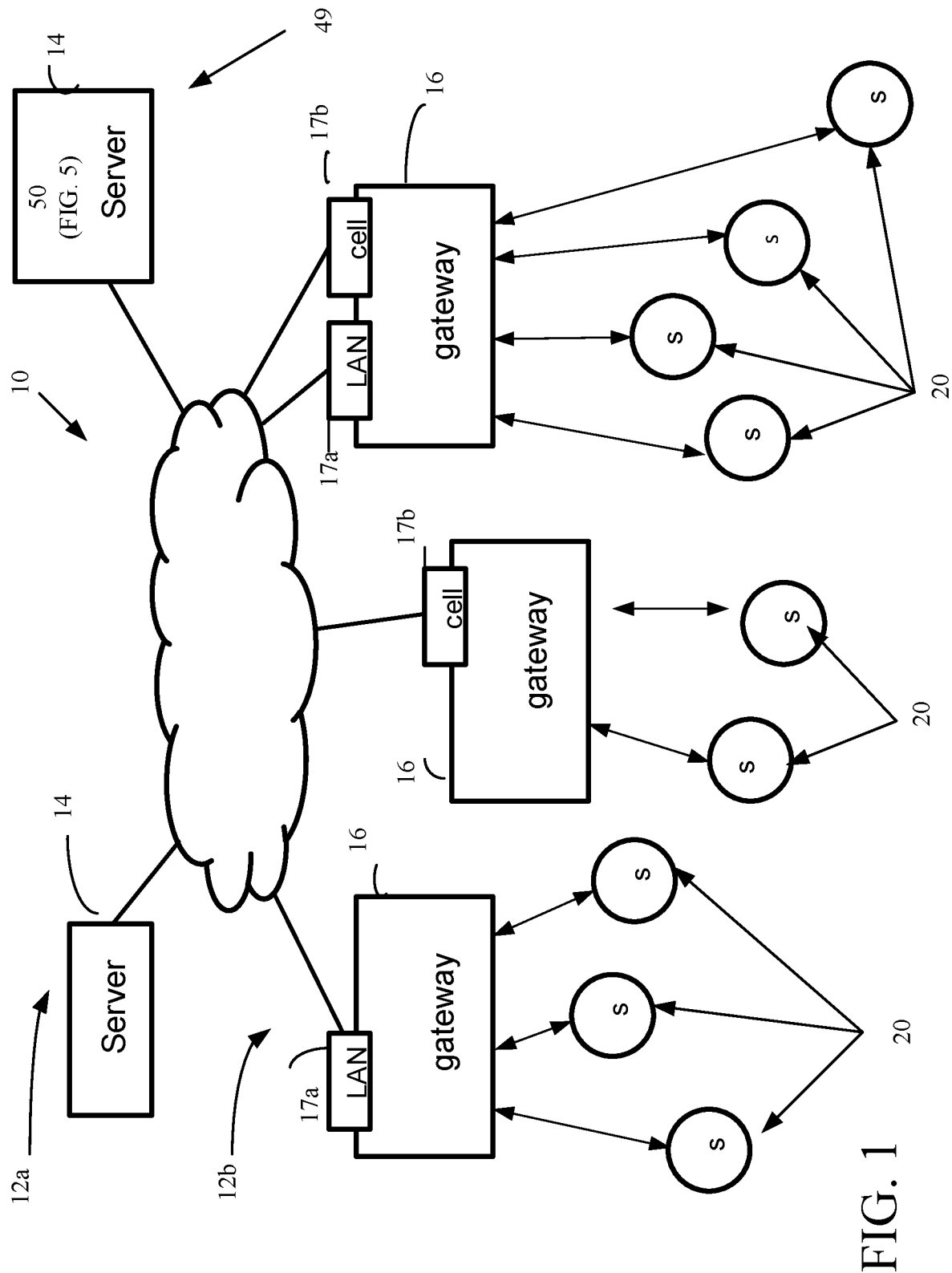
FIG. 1 is a schematic diagram of an exemplary networked security system.

Referring now to FIG. 1, an exemplary (global) distributed network topology for a wireless sensor network 10 is shown. In FIG. 1 the wireless sensor network 10 is a distributed network that is logically divided into a set of tiers or hierarchical levels 12a-12c. In an upper tier or hierarchical level 12a of the network are disposed server computer systems and/or virtual server computer systems 14 running a "cloud computing" paradigm that are networked together using well-established networking technology such as Internet protocols or which can be private networks that use none or part of the Internet. Applications that run on those server computer systems 14 communicate using various protocols such as for Web Internet networks XML/SOAP, RESTful web service, and other application layer technologies such as HTTP and ATOM. The distributed network 10 has direct links between devices (nodes) as shown and discussed below.

In one implementation hierarchical level 12a includes a central monitoring station 49 comprised of one or more of the server computers 14 and which includes or receives information from a sensor based state prediction system 50 as will be described below.

The distributed network 10 includes a second logically divided tier or hierarchical level 12b, referred to here as a middle tier that involves gateways 16 located at central, convenient places inside individual buildings and structures. These gateways 16 communicate with server computer systems 14 in the upper tier whether the server computer systems are stand-alone dedicated server computer systems and/or cloud based server computer systems running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F"), as well as wireless sensor nodes or sensor end-nodes 20 (marked in the FIG. 1 with "C"). In some embodiments wired sensors (not shown) can be included in aspects of the distributed network 10.

In a typical network, the edge (wirelessly-connected) tier of the network is largely comprised of devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional sensor node or "F" sensor node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

In some instances the sensors 20 are sensor packs (not shown) that are configured for a particular types of business applications, whereas in other implementations the sensors are found in installed systems such as the example security systems discussed below.

Figure 2:
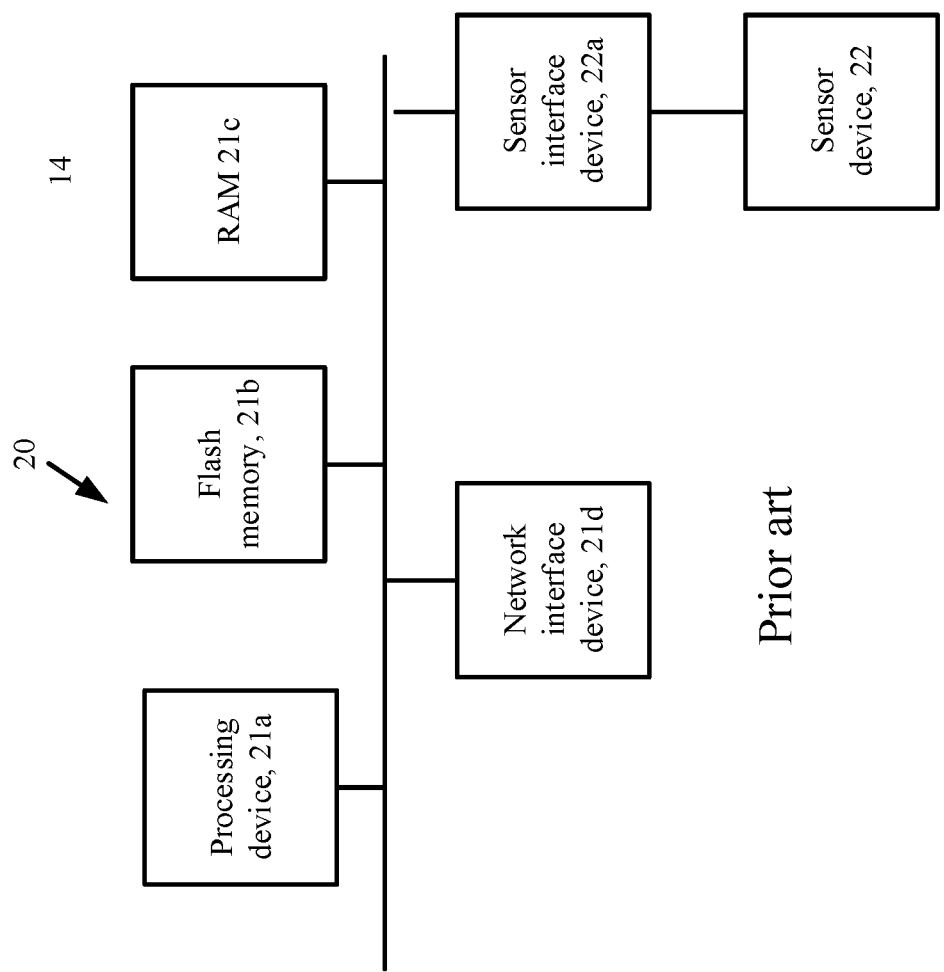
FIG. 2 is a block diagram of a sensor.

Referring to FIG. 2, a sensor device 20 is shown. Sensor device 20 includes a processor device 21a, e.g., a CPU and or other type of controller device that executes under an operating system, generally with 8-bit or 16-bit logic, rather than the 32 and 64-bit logic used by high-end computers and microprocessors. The device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less. The device 20 has a network interface card 21d that interfaces the device 20 to the network 10. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The device 20 also includes a sensor element 22 and a sensor interface 22a that interfaces to the processor 21a. Sensor 22 can be any type of sensor types mentioned above.

Also shown in FIG. 2 is a panel 38. Panel 38 may be part of an intrusion detection system (not shown). The panel 38, i.e., intrusion detection panel is coupled to plural sensors/detectors 20 (FIG. 1) disbursed throughout the physical premises. The intrusion detection system is typically in communication with a central monitoring station (also referred to as central monitoring center not shown) via one or more data or communication networks (not shown). Sensor/detectors may be hard wired or communicate with the panel 38 wirelessly. In general, detectors sense glass breakage, motion, gas leaks, fire, and/or breach of an entry point, and send the sensed information to the panel 38.

Based on the information received from the detectors 20, the panel 38, e.g., intrusion detection panel determines whether to trigger alarms and/or sending alarm messages to the monitoring station 20. A user may access the intrusion detection panel to control the intrusion detection system, e.g., disarm, arm, enter predetermined settings, etc. Other systems can also be deployed such as access control systems, etc.

Figure 3:
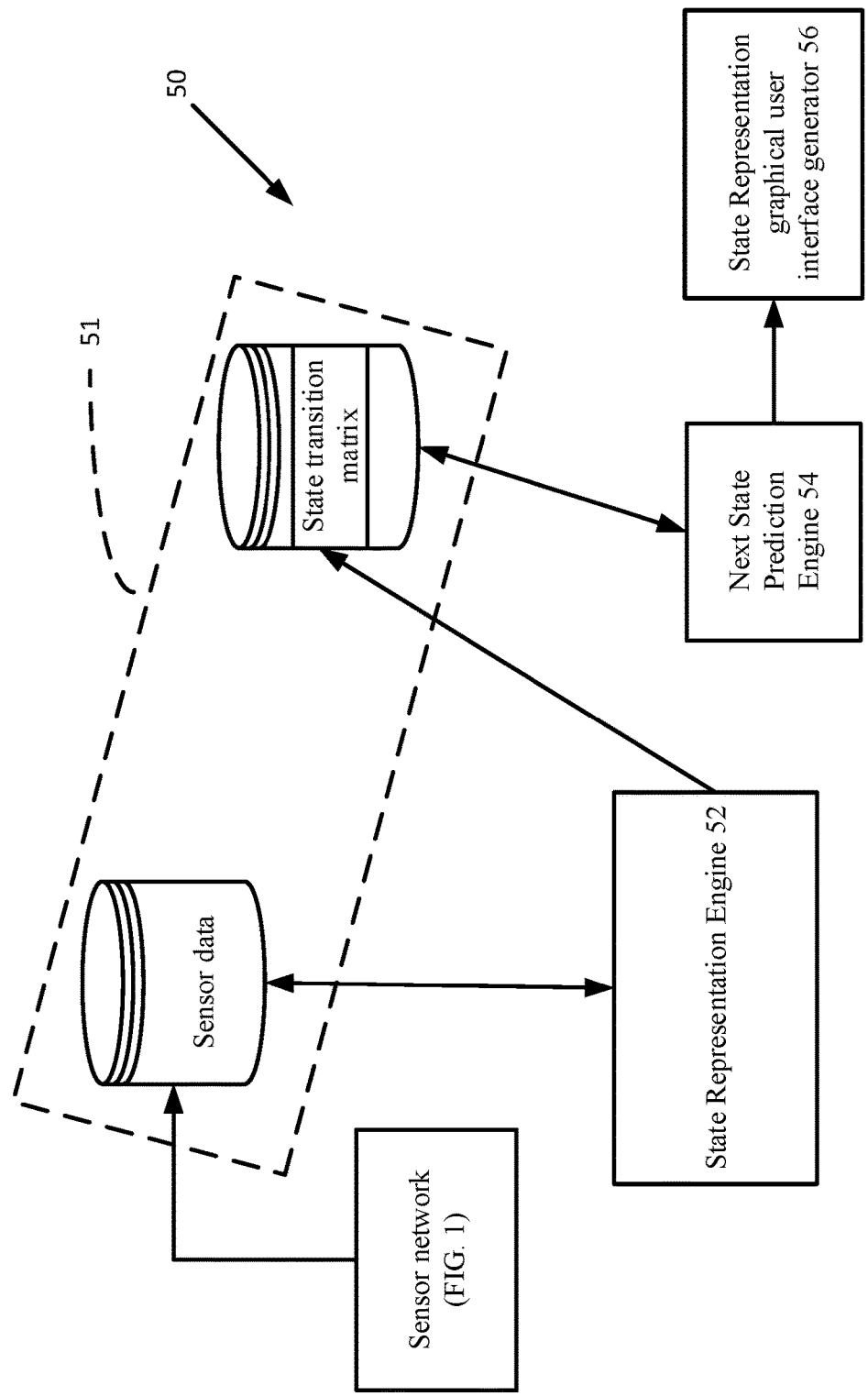
FIG. 3 is a block diagram of a sensor based state prediction system.

Referring now to FIG. 3, a sensor based state prediction system 50 is shown. The prediction system 50 executes on one or more of the cloud-based server computers and accesses database(s) 51 that store sensor data and store state data in a state transition matrix. In some implementations, dedicated server computers could be used as an alternative.

The sensor based state prediction system 50 includes a State Representation Engine 52. The State Representation Engine 52 executes on one or more of the server computer systems described above and interfaces on the server computer systems receive sensor signals from a large plurality of sensors deployed in various premises throughout an area. These sensor signals have sensor values and together with other monitoring data represent a data instance for a particular area of a particular premises in a single point in time. The data represent granular information collected continuously from the particular premises. The State Representation Engine takes these granular values and converts the values into a semantic representation. For example, a set of sensor values and monitoring data for particular time duration are assigned a label, e.g., "State-1." As the data is collected continuously, this Engine 52 works in an unsupervised manner, as discussed below, to determine various states that may exist in the premises.

As the different states are captured, this Engine 52 also determines state transition metrics that are stored in the form a state transition matrix. A simple state transition matrix has all the states in its rows and columns, with cell entries being many times did the premises move from a state in cell i to a state in cell j are over a period of time and/or events. This matrix captures the operating behavior of the system. State transitions can happen either over time or due to events. Hence, the state transition metrics are captured using both time and events. A state is a representation of a group of sensors grouped according to a clustering algorithm.

The State transition matrix is a data structure that stores how many times the environment changed from State_i to State_j. The State transition matrix thus stores "knowledge" that the sensor based state prediction system 50 captures and which is used to determine predictions of the behavior of the premises. The State transition matrix is accessed by the Next prediction engine to make decisions and trigger actions by the sensor based state prediction system 50.

Unsupervised learning e.g., clustering is used to group sensor readings into states and conditions over a period of time that form a time trigger state and over events to form an event trigger state. Used to populate the state transition matrix per premises.

An exemplary simplified depiction for explanatory purposes of a State transition matrix is set out below:

| Instance | State transition | State transition | State transition | State transition | State transition | State transition |
|---|---|---|---|---|---|---|
| | x, y | x, y | x, y | x, y | x, y | x, y |
| | x, y | x, y | x, y | x, y | x, y | x, y |
| | x, y | x, y | x, y | x, y | x, y | x, y |

Where columns in the State transition matrix is are "state transitions" expressed as a listing by instance with pointer to the state time and event trigger tables.

Entries x,y in cells of the State transition matrix are pointers that corresponds to the trigger tables that store the number of time periods and events respectively for each particular cell of the State transition matrix.

The State time trigger is depicted below. The State time trigger tracks the time periods t1 . . . t8 for each state transition corresponding to the number x in each particular cell.

| | t1 | t2 | t3 | *** |
|---|---|---|---|---|
| Instance | State transition 1 | State transition 2 | State transition 3 | *** |
| | 1 | 1 | 1 | *** |
| | 1 | 1 | 1 | *** |
| | t1 t5 | t2 t3 | t4 t7 t8 | *** |

State event trigger tracks the events E1 . . . E2 for each state transition corresponding to the number y in each particular cell (if any).

| | e1 | e2 | e3 | *** |
|---|---|---|---|---|
| Instance | State transition 1 | State transition 2 | State transition 3 | *** |
| | | | E2 | *** |
| | | | E2 | *** |
| | E1 | E1 | E3 | *** |

The State Representation Engine 52 in addition to populating the State transition matrix, also populates a State time trigger that is a data structure to store, the time value spent in each state and a distribution of the time duration for each state. Similar to the State transition matrix, the State time trigger also encapsulates the behavior knowledge of the environment. State transitions can be triggered using these values.

The State Representation Engine 52 also populates a State event trigger. The State event trigger is a data structure to store, event information. An example of an event can be sensor on a door sensing that a door was opened. There are many other types of events. This data structure captures how many times such captured events caused a state transition.

The State Representation Engine 52 populates the State Transition matrix and the State Time and State triggers, which together capture metrics, which provide a Knowledge Layer of the operational characteristics of the premises.

The sensor based state prediction system 50 also includes a Next State Prediction Engine 54. The Next State Prediction Engine 54 predicts an immediate Next state of the premises based the state transition matrix. The Next State Prediction Engine 54 predicts if the premises will be in either a safe state or a drift state over a time period in the future. The term "future" as used herein refers to a defined window of time in the future, which is defined so that a response team has sufficient time to address a condition that is predicted by the Next State Prediction Engine 54 that may occur in the premises to restore the state of the premises to a normal state. The Next State Prediction Engine operates as a Decision Layer in the sensor.

The sensor based state prediction system 50 also includes a State Representation graphical user interface generator 56. State Representation graphical user interface generator 56 provides a graphical user interface that is used by the response team to continuously monitor the state of the premises. The State Representation graphical user interface generator 56 receives data from the Next State Prediction Engine 54 to graphically display whether the premises is either in the safe state or the drifting state. The State Representation graphical user interface generator 56 operates as an Action Layer, where an action is performed based on input from Knowledge and Decision Layers.

The sensor based state prediction system 50 applies unsupervised algorithm learning models to analyze historical and current sensor data records from one or more customer premises and generates a model that can predict Next patterns, anomalies, conditions and events over a time frame that can be expected for a customer site. The sensor based state prediction system 50 produces a list of one or more predictions that may result in on or more alerts being sent to one more user devices as well as other computing system, as will be described. The prediction system 50 uses various types of unsupervised machine learning models including Linear/Non-Linear Models, Ensemble methods etc.

Figure 3A:
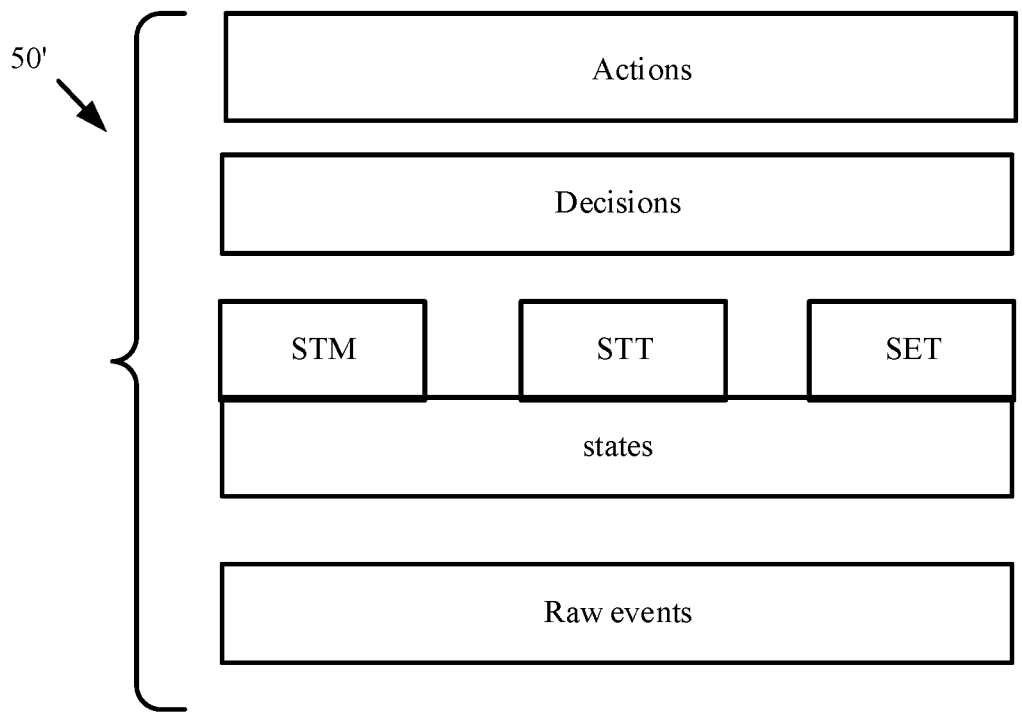
FIG. 3A is a diagram of a logical view of the sensor based state prediction system of FIG. 3.

Referring now to FIG. 3A, a logical view 50' of the sensor based state prediction system 50 is shown. In this view at the bottom is the raw events layer that is the sensors values and monitoring data from the environment under surveillance. The middle layer is an abstraction layer that abstracts these raw events as state (represented in FIG. 5A by the blocks "States" (State Representation Engine 52), STM (State Transition Matrix), STT (State Time Trigger) and SET (State Event Trigger) that produce a state as a concise semantic representation of the underlying behavior information of the environment described by time and various sensor values at that point in time. With the upper blocks being a Decisions block (Next State Prediction Engine 54) and Actions block (State Representation graphical user interface generator 56.)

Figure 4:
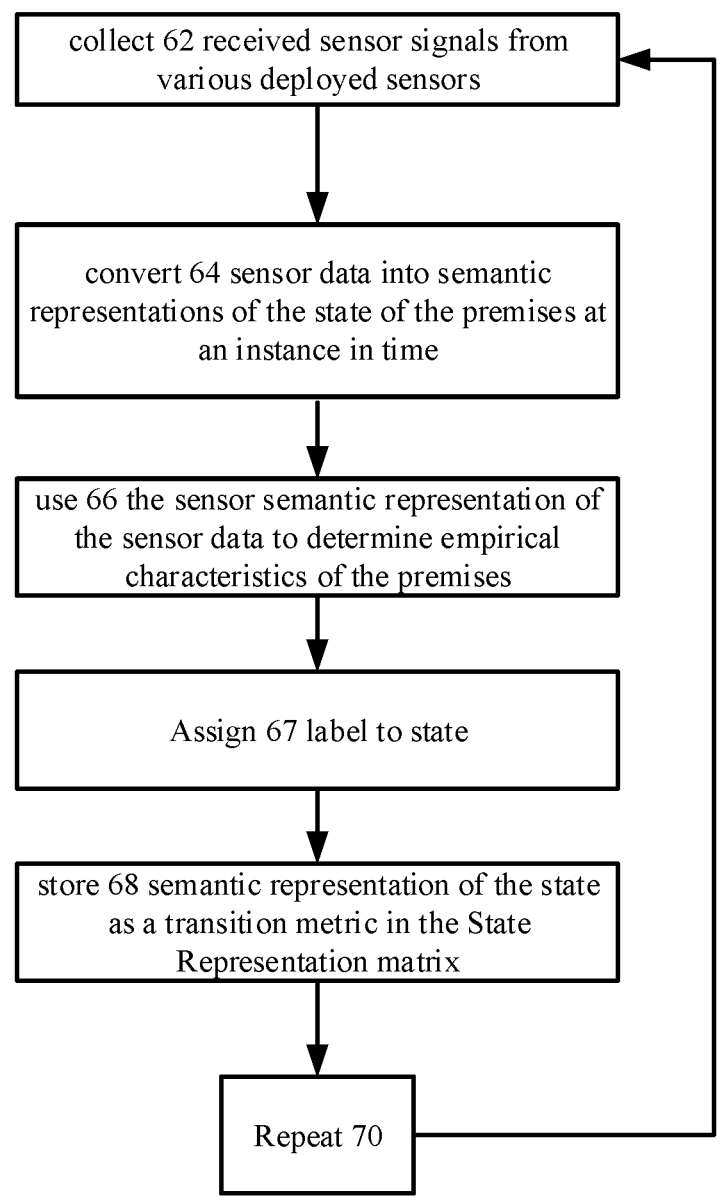
FIG. 4 is a flow diagram of a state representation engine.

Referring now to FIG. 4, the processing 60 for the State Representation Engine 52 is shown. The State Representation Engine 55 collects 62 (e.g., from the databases 51 or directly from interfaces on the server computer systems) received sensor signals from a large plurality of sensors deployed in various premises throughout an area that is being monitored by the sensor based state prediction system 50. The sensor data collected from the premises, includes collected sensor values and monitoring data values.

An example of the sensor values is shown below (using fictitious data):

Site no.: 448192

Kitchen thermostat: 69,

Stove thermostat: 72,

Outdoor security panel: Active,

Kitchen Lights: On,

Delivery Door: Shutdown

As these sensor signals have sensor values that represent a data instance for a particular area of a particular premises in a single point in time, the State Representation Engine 52 converts 64 this sensor data into semantic representations of the state of the premises at instances in time. The State Representation Engine 52 uses 66 the converted sensor semantic representation of the sensor data collected from the premises to determine the empirical characteristics of the premises. The State Representation Engine 52 assigns 67 an identifier to the state.

For example, the kitchen in a restaurant example for a premises identified in the system as "Site no.: 448192" uses the sensor values to produce a first state that is identified here as "State 1." Any labelling can be used and is typically consecutive identified and this state is semantically described as follows:

State 1: Kitchen thermostat: 69, Stove thermostat: 72, Outdoor security panel: Active, Kitchen Lights: On, Delivery Door: Shutdown, current time: Monday 5:00 AM PST, start time: Sunday 10:00 PM PST The semantic description includes the identifier "State 1" as well as semantic descriptions of the various sensors, their values and dates and times.

The State Representation Engine 52 determines an abstraction of a collection of "events" i.e., the sensor signals as state. The state thus is a concise representation of the underlying behavior information of the premises being monitored, described by time and data and various sensor values at that point in time and at that date.

The semantic representation of the state is stored 68 by the State Representation Engine 52 as state transition metrics in the State Representation matrix. Over time and days, as the sensors produce different sensor values, the State Representation Engine 55 determines different states and converts these states into semantic representations that are stored the state transition metrics in the matrix, e.g., as in a continuous loop 70.

The kitchen example is further set out below:

The State Representation Engine 52 collects the following data (fictitious data) from these three sensors at a particular points in time,

| Obstruction Detector | Room Thermostat | Stove Thermostat |
|---|---|---|
| 0 | 71.1755732 | 78.95655605 |
| 0 | 68.27180645 | 79.97821825 |
| 0 | 71.80483918 | 79.428149 |
| 0 | 70.46354628 | 81.90901291 |
| 0 | 69.83508114 | 81.12026772 |
| 0 | 71.46074066 | 81.613552 |
| 1 | 70.14174204 | 80.12242015 |
| 1 | 70.98180652 | 78.03049081 |

The state representation engine 52, converts these raw values into state definitions and assigns (labels) each with a unique identifier for each state, as discussed above. As the premises is operated over a period of time, the Next transition matrix, the state time trigger matrix and the state event trigger matrix are filled.

Continuing with the concrete example, the state representation engine 52 produces the following two states (State 1 is repeated here for clarity in explanation).

State 1: Kitchen thermostat: 69, Stove thermostat: 72, Outdoor security panel: Active, Kitchen Lights: On, Delivery Door: Shutdown, current time: Sunday 10:00 PM.

State 2: Kitchen thermostat: 69, Stove thermostat: 80, Outdoor security panel: Active, Kitchen Lights: On, Delivery Door: Shutdown, current time: Sunday 10:15 PM State 3: Kitchen thermostat: 69, Stove thermostat: 60, Outdoor security panel: Active, Kitchen Lights: On, Delivery Door: Shutdown, current time: Monday 1:00 AM.

Between State 1 and State 2 there is a transition in which over a 15 minute span the Stove thermostat value increased from 72 to 80 and from State 2 to State 3 the Stove thermostat value decreased from 80 to 72 over a 2 hr. and 45 min. period, which can likely be attributed to something being cooked between State 1 and State 2 and by State 3 the order was filled, item removed from stove and the stove thermostat shows a lower value.

The state representation engine 52, adds to the state transition matrix an entry that corresponds to this transition, that the premises moved from state 1 to state 2. The state representation engine 52, also adds to the state transition matrix in that entry, an indicator that the transition was "time trigger," causing the movement, and thus the state representation engine 52 adds an entry in state time trigger matrix. The state representation engine 52, thus co-ordinates various activities inside the premises under monitoring and captures/determines various operating characteristics of the premises.

Figure 5:
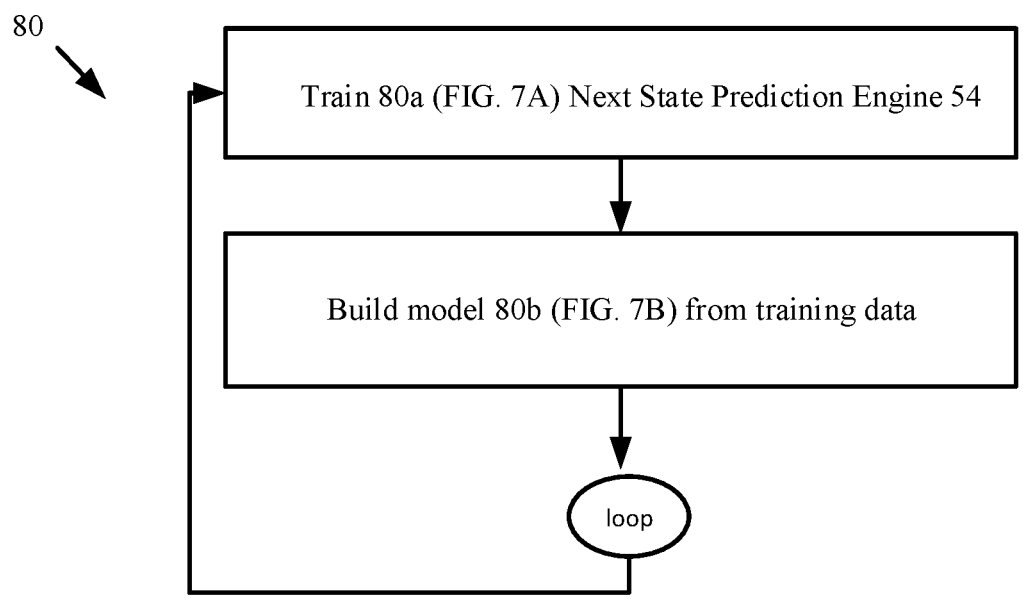
FIG. 5 is a flow diagram of sensor based state prediction system processing.

Referring now to FIG. 5 processing 80 for the Next State Prediction Engine 54 is shown. This processing 80 includes training processing 80a (FIG. 5A) and model building processing 80b (FIG. 5B), which are used in operation of the sensor based state prediction system 50.

Figure 5A:
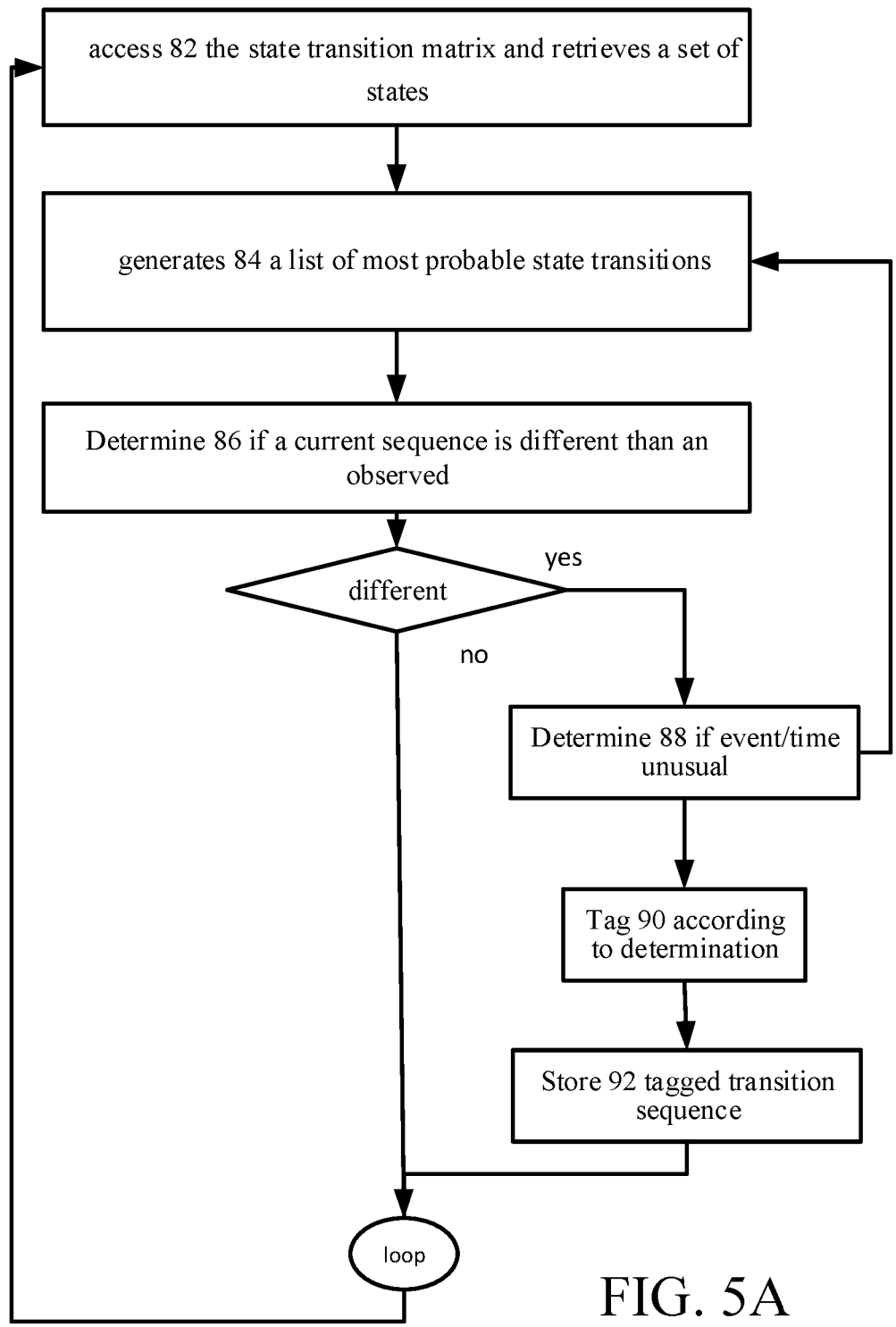
FIG. 5A is a flow diagram of training process for a Next state predictor engine that is part of the sensor based state prediction system.

Referring now to FIG. 5A, the training processing 80a that is part of the processing 80 for the Next State Prediction Engine 54 is shown. In FIG. 5A, training processing 80' trains the Next State Prediction Engine 54. The Next State Prediction Engine 54 accesses 82 the state transition matrix and retrieves a set of states from the state transition matrix. From the retrieved set of states the Next State Prediction Engine 54 generates 84 a list of most probable state transitions for a given time period, the time period can be measured in minutes, hours, days, weeks, months, etc. For example, consider the time period as a day. After a certain time period of active usage, the sensor based state prediction system 50, through the state representation engine 52, has acquired knowledge states s1 to s5.

From the state transition matrix the system uses the so called "Markov property" to generate state transitions. As known, the phrase "Markov property" is used in probability and statistics and refers to the "memoryless" property of a stochastic process.

From the state transition matrix using the so called "Markov property" the system generates state transition sequences, as the most probable state sequences for a given day.

An exemplary sequence uses the above fictitious examples is shown below:
s1 s2 s4 s5
s2 s2 s4 s5

The Next State Prediction Engine 54 determines 86 if a current sequence is different than an observed sequence in the list above. When there is a difference, the Next State Prediction Engine 54 determines 88 whether something unusual has happened in the premises being monitored or whether the state sequence is a normal condition of the premises being monitored.

With this information the Next State Prediction Engine 54 90 these state transitions as "safe" or "drift state" transitions. Either the Next State Prediction Engine 54 or manual intervention is used to label either at the state transition level or the underlying sensor value levels (fictitious) for those state transitions producing the follow:

| Obstruction Detector | Room Thermostat | Stove Thermostat | Safety State (label) |
|---|---|---|---|
| 0 | 71.1755732 | 78.95655605 | G |
| 0 | 68.27180645 | 79.97821825 | G |
| 0 | 71.80483918 | 79.428149 | G |
| 0 | 70.46354628 | 81.90901291 | G |
| 0 | 69.83508114 | 81.12026772 | G |
| 0 | 71.46074066 | 81.613552 | G |
| 1 | 70.14174204 | 80.12242015 | G |
| 1 | 70.98180652 | 78.03049081 | G |
| 0 | 68.58285177 | 79.981358 | G |
| 0 | 69.91571802 | 79.4885171 | G |
| 1 | 69.89799953 | 79.3838372 | G |
| 0 | 70.42668373 | 80.20397118 | G |
| 1 | 70.23391637 | 81.80212485 | Y |
| 0 | 68.19244768 | 81.19203004 | G |

The last column in the above table is the label, wherein in this example "G" is used to indicate green, e.g., a normal operating state, e.g., "a safe state" and "Y" is used to indicate yellow, e.g., an abnormal or drift state, e.g., an "unsafe state" and "R" (not shown above) would be used to represent red or a known unsafe state. This data and states can be stored in the database 51 and serves as training data for a machine learning model that is part of the Next State Recommendation Engine 54.

Figure 5B:
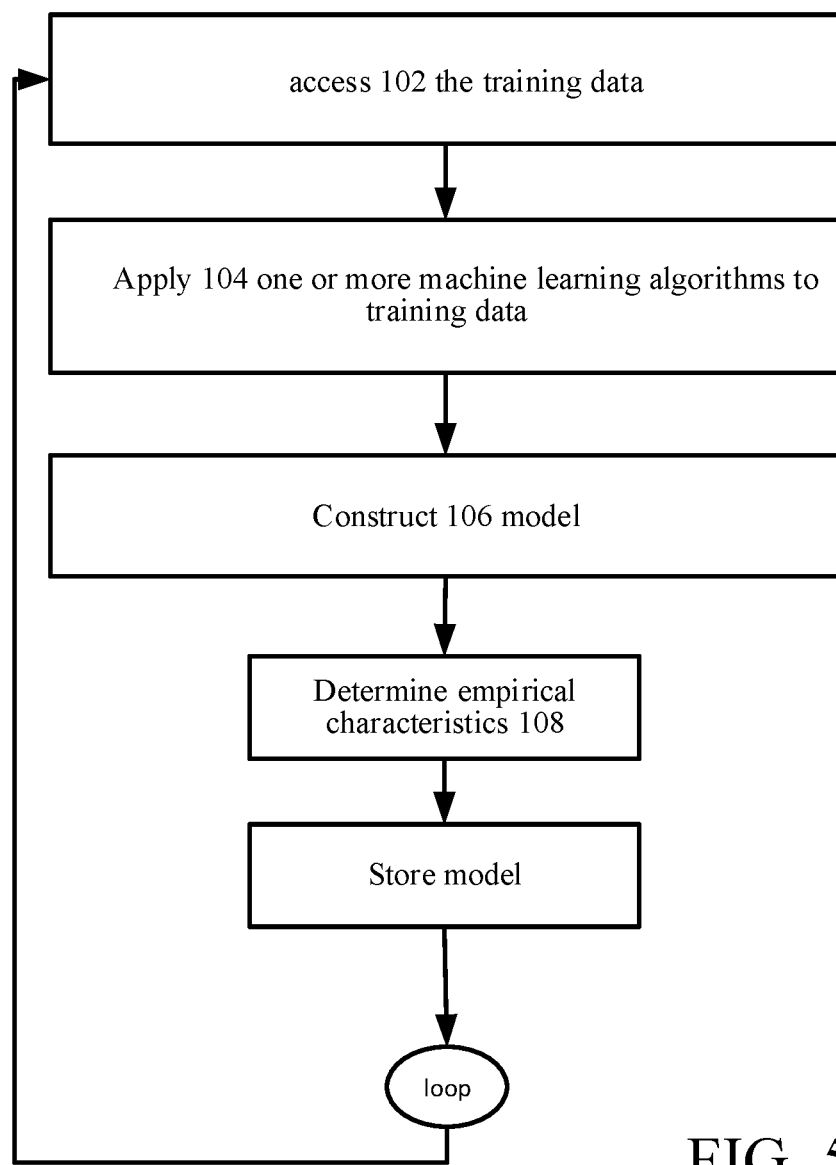
FIG. 5B is a flow diagram of a Next state predictor engine model building process.

Referring now to FIG. 5B, the model building processing 80b of the Next State Recommendation Engine 54 is shown. The model building processing 80b uses the above training data to build a model that classify a system's state into either a safe state or an unsafe state. Other states can be classified. For example, three states can be defined, as above, "G Y R states" or green (safe state) yellow (drifting state) and red (unsafe state). For ease of explanation two states "safe" (also referred to as normal) and "unsafe" (also referred to as drift) are used. The model building processing 80b accesses 102 the training data and applies 104 one or more machine learning algorithms to the training data to produce the model that will execute in the Next State Recommendation Engine 54 during monitoring of systems. Machine learning algorithms such as Linear models and Non-Linear Models, Decision tree learning, etc., which are supplemented with Ensemble methods (where two or more models votes are tabulated to form a prediction) and so forth can be used. From this training data and the algorithms, the model is constructed 106.

Below is table representation of a fictitious Decision Tree using the above fictitious data (again where "G" is used to indicate green, "a safe state" e.g., a normal operating state, and "Y" is used to indicate yellow, e.g., drifting state, and "R" (shown below) to represent red or a known unsafe state. This data and states can be stored in the database 51 and serves as training data for a machine learning model that is part of the Next State Recommendation Engine 54.

stoveThermoStat='(-inf-81.064396]'
| obstructionDetector=0: G
| obstructionDetector=1: G
stoveThermoStat='(81.064396-84.098301]'
| obstructionDetector=1: G
stove ThermoStat='(84.098301-87.13220]': R
stoveThermoStat='(87.132207-90.166112]'
| obstructionDetector=0: R
| obstructionDetector=1: R
stoveThermoStat='(90.166112-inf)'
| obstructionDetector=0: R
| obstructionDetector=1: R Empirical characteristics can be a model based and human based are determined 106 for various states of the premises in terms of, e.g., safety of the occupants and operational conditions of the various systems within the premises. Examples of such systems include intrusion detection systems, fire alarm systems, public annunciation systems, burglar alarm systems, the sensors deployed at the premises, as well as other types of equipment, such as refrigeration equipment, stoves, and ovens that may be employed in the kitchen example that will be discussed below. Other instances of particular premises will have other types of systems that are monitored. Based on the empirical determined states of the various systems within the premises being monitored, the sensor based state prediction system 50 will determine the overall state of the premises as well as individual states of the various systems within the premises being monitored, as will be discussed below.

Figure 6:
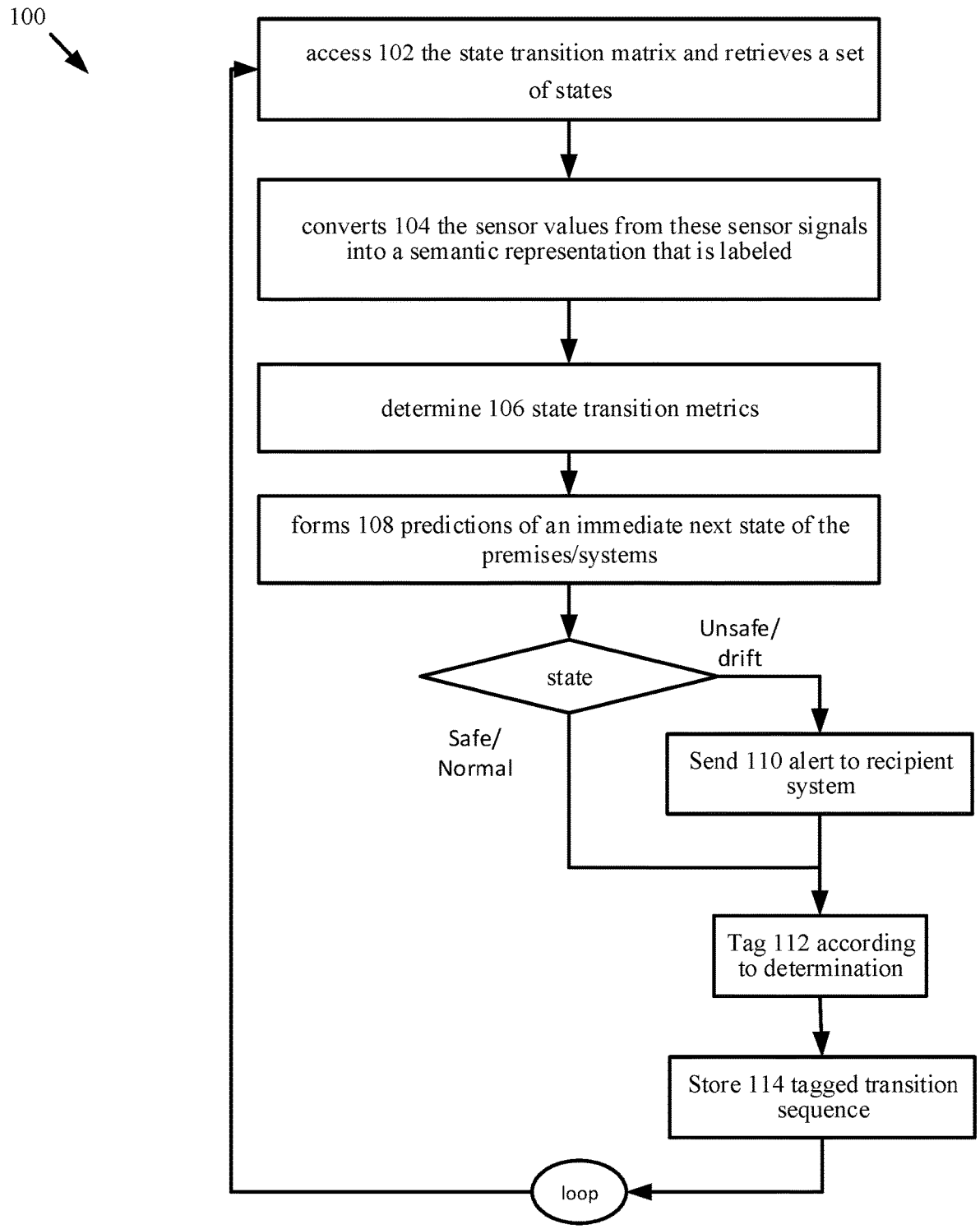
FIG. 6 is a flow diagram of operation processing by the sensor based state prediction system.

Referring now to FIG. 6, operational processing 100 of the sensor based state prediction system 50 is shown. The sensor based prediction system 50 receives 102 (by the State Representation Engine 52) sensor signals from a large plurality of sensors deployed in various premises throughout an area being monitored. The State Representation Engine 52 converts 104 the sensor values from these sensor signals into a semantic representation that is identified, as discussed above. As the data is collected continuously, this Engine 52 works in an unsupervised manner to determine various states that may exist in sensor data being received from the premises. As the different states are captured, the State Representation Engine 52 also determines 106 state transition metrics that are stored in the state transition matrix using both time and events populating the State time trigger and the State event trigger, as discussed above. The State transition matrix is accessed by the Next prediction engine 54 to make decisions and trigger actions by the sensor based state prediction system 50.

The Next State Prediction Engine 54 receives the various states (either from the database and/or from the State Representation Engine 52 and forms 108 predictions of an immediate Next state of the premises/systems based the state data stored in the state transition matrix. For such states the Next State Prediction Engine 54 predicts if the premises will be in either a safe state or a drift state over a time period in the Next as discussed above.

The sensor based state prediction system 50 also sends 110 the predictions to the State Representation engine 56 that generates a graphical user interface to provide a graphical user interface representation of predictions and states of various premises/systems. The state is tagged 112 and stored 114 in the state transition matrix.

The sensor based state prediction system 50 using the State Representation Engine 52 that operates in a continuous loop to generate new states and the Next State Prediction Engine 54 that produces predictions together continually monitor the premises/systems looking for transition instances that result in drift in states that indicate potential problem conditions. As the sensors in the premises being monitored operate over a period of time, the state transition matrix, the state time trigger matrix and the state event trigger matrix are filled by the state representation engine 52 and the Next State Prediction Engine 54 processing 80 improves on predictions.

The sensor based state prediction system 50 thus determines the overall state of the premises and the systems by classifying the premises and these systems into a normal or "safe" state and the drift or unsafe state. Over a period of time, the sensor based state prediction system 50 collects information about the premises and the sensor based state prediction system 50 uses this information to construct a mathematical model that includes a state representation, state transitions and state triggers. The state triggers can be time based triggers and event based triggers, as shown in the data structures above.

Figure 7:
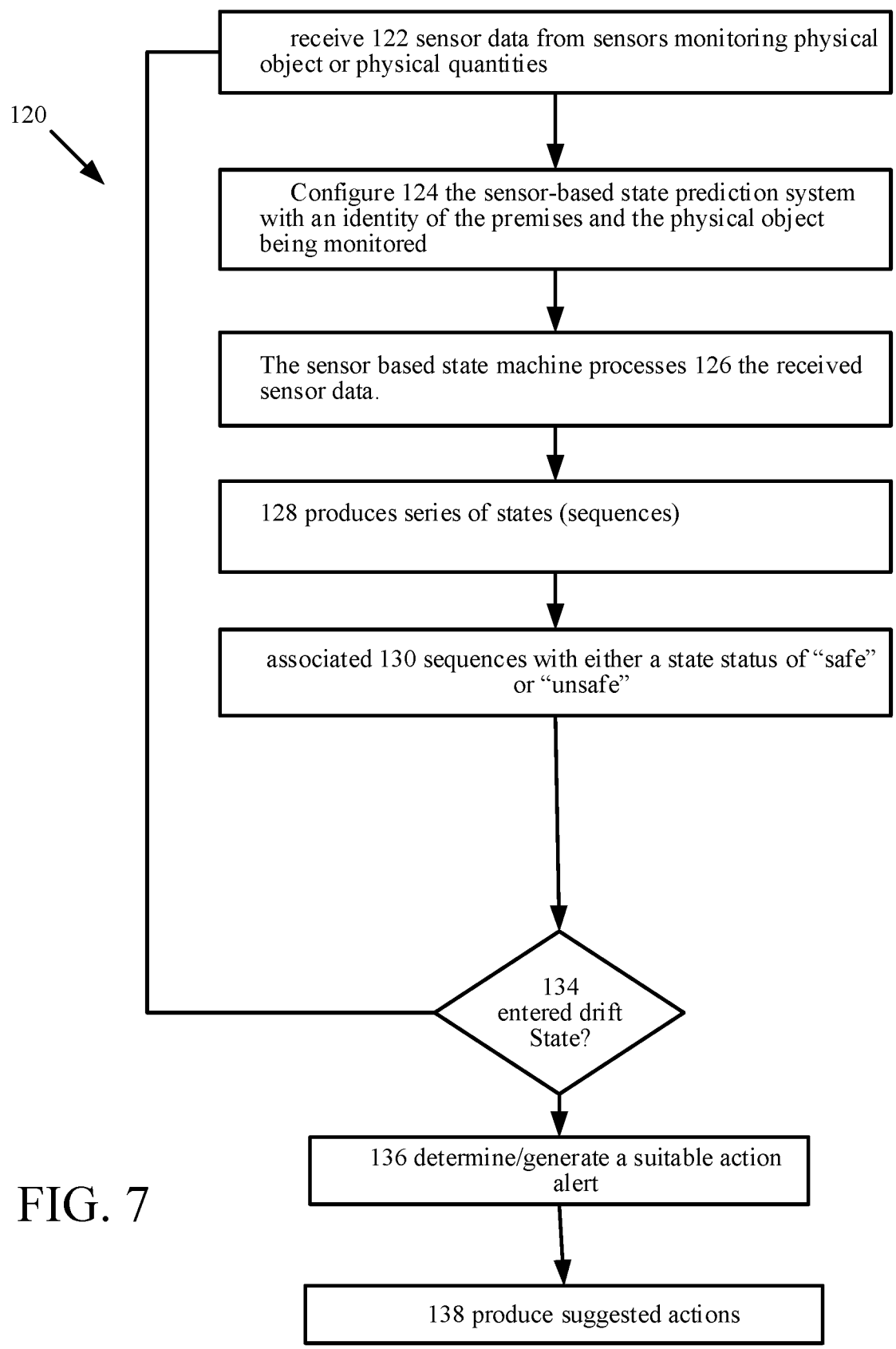
FIG. 7 is a flow diagram of an example of sensor based risk profiling.

Referring now to FIG. 7, processing 120 of sensor information using the architecture above is shown. The sensor-based state prediction system 50 receives 122 sensor data from sensors monitoring each physical object or physical quantity from the sensors (FIG. 2) deployed in a premises. The sensor-based state prediction system 50 is configured 124 with an identity of the premises and the physical objects being monitored by the sensors in the identified premises. The sensor based state machine 50 processes 126 the received sensor data to produce states as set out above using the unsupervised learning models. Using these models the sensor-based state prediction system 50 monitors various physical elements to detect drift states.

For example, one of the sensors can be a vibration sensor that sends the sensor-based state prediction system 50 a signal indicating a level of detected vibration from the vibration sensor. This signal indicates both magnitude and frequency of vibration. The sensor-based state prediction system 50 determines over time normal operational levels for that sensor based on what system that sensor is monitoring and together with other sensors produces 128 series of states for the object and/or premises. These states are associated 130 with either a state status of "safe" or "unsafe" (also referred to herein as "normal" or "drift," respectively). Part of this process of associating is provided by the learning process and this associating can be empirically determined based on human input. This processing thus develops more than a mere envelope or range of normal vibration amplitude and vibration frequency indications for normal operation for that particular vibration sensor, but rather produces a complex indication of a premises or object state status by combining these indications for that sensor with other indications from other sensors to produce the state transition sequences mentioned above.

States are produced from the unsupervised learning algorithms (discussed above in FIGS. 5-5B) based on that vibration sensor and states from other sensors, which are monitoring that object/premises. The unsupervised learning algorithms continually analyze that collected vibration data and producing state sequences and analyze state sequences that include that sensor. Overtime, as the analysis determines 134 that states including that sensor have entered into a drift state that corresponds to an unsafe condition, the sensor-based state prediction system 50 determines 136 a suitable action alert (in the Action layer) to indicate to a user that there may be something wrong with the physical object being monitored by that sensor. The analysis provided by the prediction system sends the alert to indicate that there is something going wrong with object being monitored. The sensor-based state prediction system 50 produces suggested actions 138 that the premises' owner should be taking with respect to the object being monitored.

Figure 8:
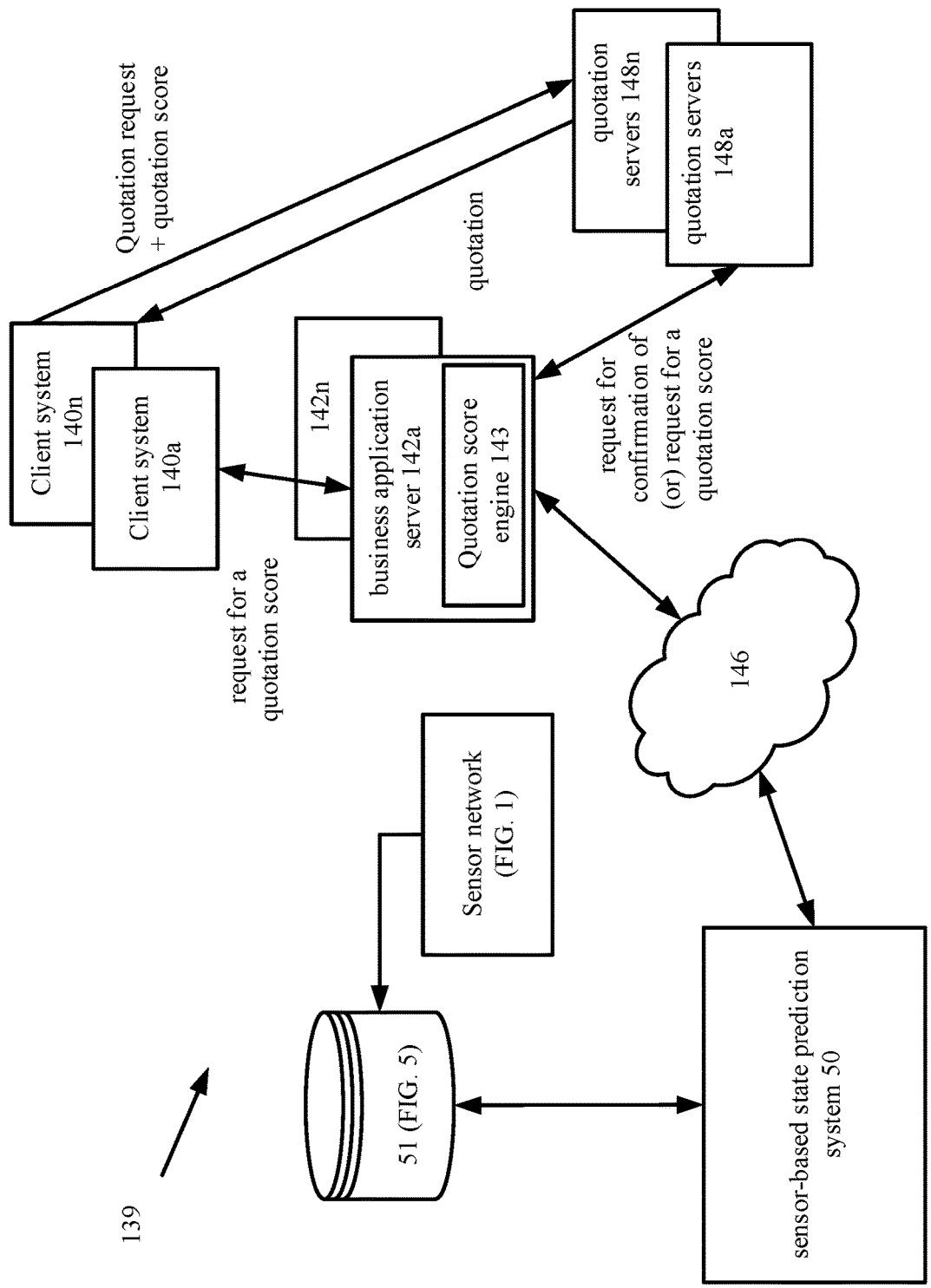
FIG. 8 is a block diagram of a system architecture.

Referring now to FIG. 8, an architecture 139 that uses the sensor-based state prediction system 50 (FIG. 5) in a cooperative relationship with business application server computer systems 142a-142n in the cloud to produce a quotation score is shown. The quotation score is a measure of actual risk as determined by monitoring current conditions in a premises over a period of time. The monitoring of current conditions is in contrast to personal information that is sent along with a request.

In FIG. 8, the sensor-based state prediction system 50 receives sensor data from the sensor network 11 (or storage 51) for a particular premises and processes that data to produce states and state sequences. Business application server computer systems 142a-142n receive the state and state sequence data from the sensor-based state prediction system 50 (FIG. 5), via a network 146 (typically the Internet) and receives specific pre-quotation characteristic information from client systems 140a-140n. From the state sequence information the business application server computer systems 142a-142n produce a quotation score by quotation score engine 143. In this instances, client systems 140a-140n are personal computers, server computers, tablets, etc. that are associated with corresponding entities that are seeking to generate a quotation score. The details of the generation of the quotation score will be discussed below.

Also shown in FIG. 8, are quotation server computer systems 148a-148n that are associated with insurance companies and/or underwriting agent systems (not otherwise shown). The quotation server computer systems 148a-148n receive a quotation request and a generated, encrypted quotation score from client systems 140a-140n. The quotation server computer systems 148a-148n process the receive quotation request and associated generated quotation score from a requesting one, e.g., client system 14a of the client systems 140a-140n in order to determine a quotation that is sent back to the client system 140a.

Figure 9:
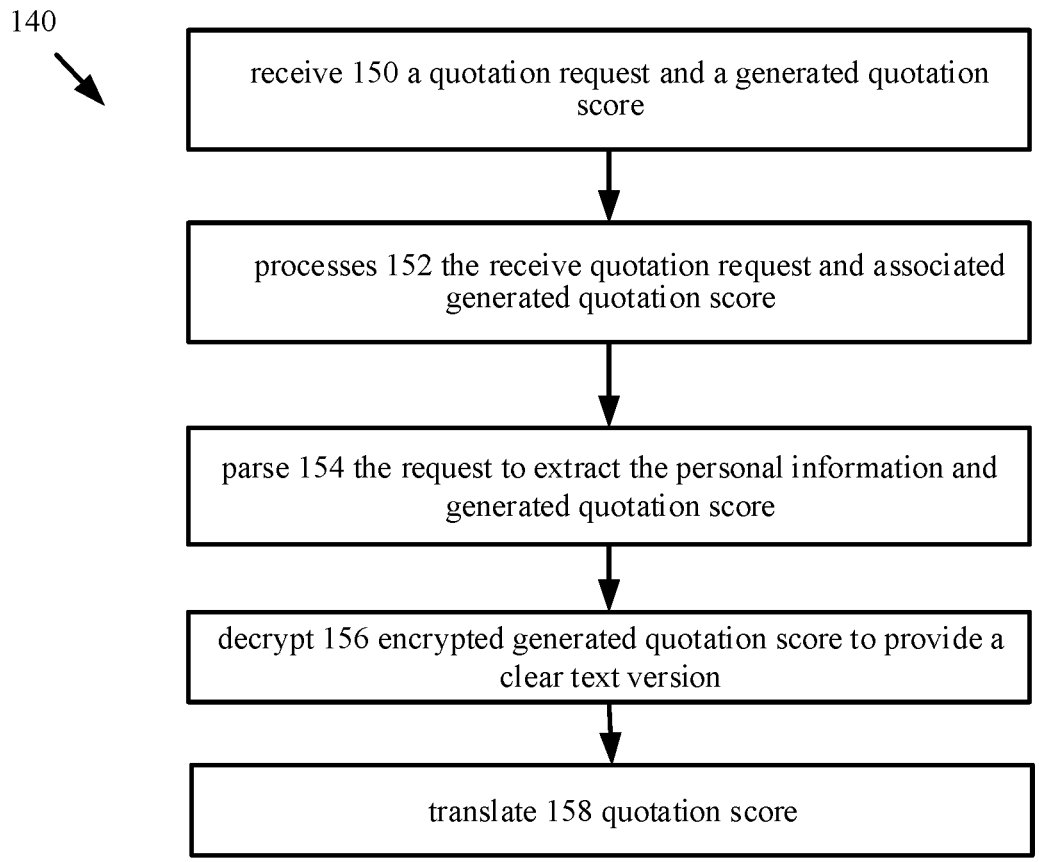
FIG. 9 is a flow diagram of overview of indication based sensor control.

Referring now to FIG. 9, furnishing of a quotation based on the generated quotation score is shown. One or more of the quotation server computer systems 148a-148n, receive 150 a quotation request and a generated quotation score from client systems 140a-140n. In embodiments at least the quotation score is encrypted. As an alternative, upon receiving a quotation request the system furnishing that quotation can send a request to the business application server computer systems 142a-142n for a confirmatory copy of the quotation score to compare to the received quotation score. The quotation server computer systems 148a-148n process 152 the receive quotation request and associated generated quotation score from a requesting one, e.g., client system 14a of the client systems 140a-140n. The quotation server computer systems 148a-148n determine a quotation that is sent back to the client system 140a.

The quotation server computer systems 148a-148n parse 154 the request to extract the specific pre-quotation characteristic information (typically conventional information such as name, address, line(s) of coverage desired, e.g., fire, theft, liability, etc., details on the premises, such as specific equipment, contents, building construction, original costs replacement costs, etc.) and to extract the generated quotation score produced by process discussed below. As the generated quotation score is received as an encrypted generated quotation score, the quotation server computer systems decrypts 156 the encrypted generated quotation score to provide a clear text version of the generated score. The clear text version of the generated score is translated 158 into a form that can be used by the insurance carrier to furnish a quotation.

One approach to translation of the generated score is to obtain the clear text version of the generated score and translate that clear text version of the score into a standardized quotation score that is standard across all (or many) insurance carriers. Alternatively, each insurance carrier can translate the score according to specific underwriting rules of that particular carrier. That is, a standardized manner can be set that would be applicable across a group of different insurance carriers or each insurance carrier can develop a specific methodology to translate the clear text version of the generated score into a quotation.

Several approaches can be developed including proprietary approaches that use the generated score as one of several factors that are evaluated to determine risk and a corresponding quotation. One specific approach to translate the generated score into the standardized quotation is to use the score as an index into a set of standardized quotations. The standardized quotation will include standard policy terms, such as coverages and exclusions, coverage amount ranges and a price for a policy for specific amounts of coverage. The specific coverages and exclusions, would be often common among various insurance companies, and in many instances would be governed under sovereign regulations (i.e., in the United States, State and/or Federal laws). On the other hand, coverage amounts and prices would likely be more subject to specific determinations by different insurance carriers.

In some implementations, the specific pre-quotation characteristic information is used to select among translation schemes that are written for various lines of insurance coverage. In other implementations, there is but one translation scheme that translates the generated quotation score into a score that is used by the insurance company to access quotations each or at least several lines of insurance coverage. In still other implementations a company's risk assessment algorithm is modified to produce the quotation score taking into consideration risk analysis, based on actual sensor conditions and more specifically collected sequence states, incident data and loss data associated with the sequence states, which continually evolve and change overtime by use of the machine learning algorithms.

The quotation server computer systems 148a-148n store the quotation score and can store the quotation score and specific collected sequence states, incident data and loss data associated with the sequence states that were used in determining the quotation score.

Figure 10A:
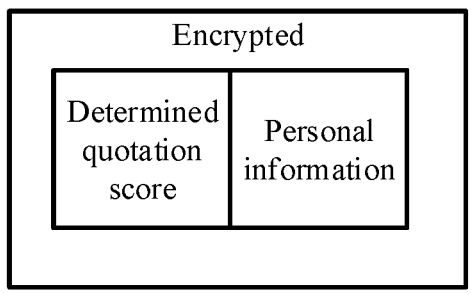
FIGS. 10A and 10B are diagrams of exemplary quotation packages.
Figure 10B:
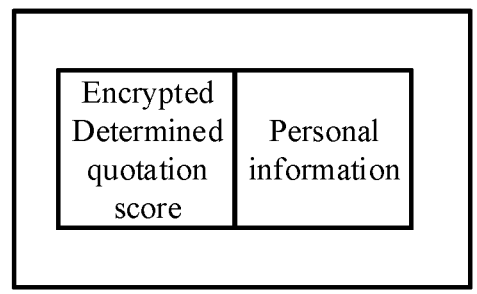
Figure 10:
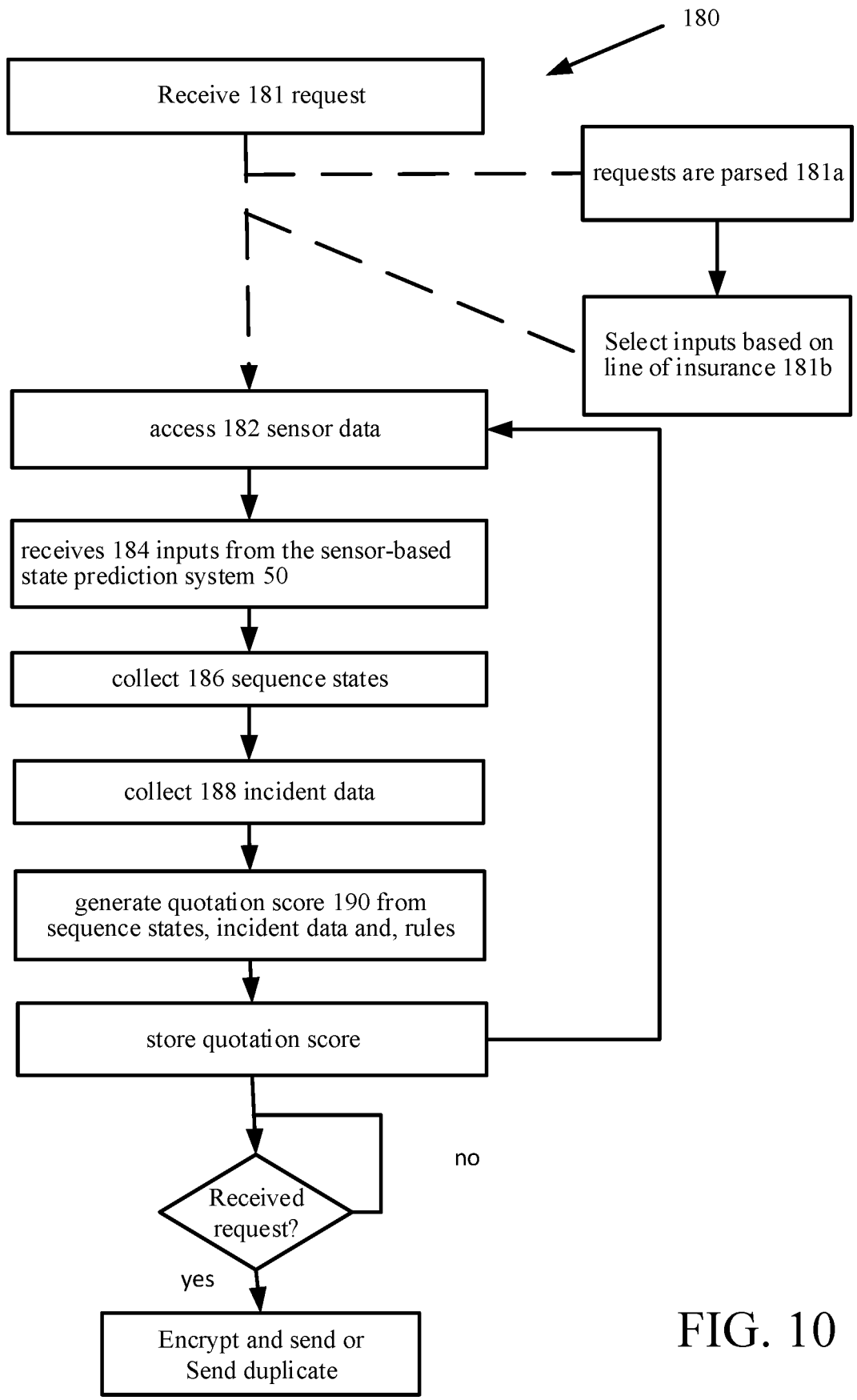
FIG. 10 is a flow diagram of an example of indication based sensor control.

Referring now to FIG. 10, the quotation generation engine 143 executed on the business application server computer systems 142a-142n is shown. The application server computer systems 142a-142n receives 181 a request for a quotation score.

The business application server computer systems 142a-142n access 182 sensor data from sensors that are part of various systems (e.g., fire, intrusion, access control systems, etc.) installed in the premises, as discussed above. The application server computer systems 142a-142n can be part of event prediction module 140 (which can be part of the sensor-based state prediction system 50). The application server computer systems 142a-142n receives 184 inputs from the sensor-based state prediction system 50. These inputs are at a minimum generated sequence states as set out above. The application server computer systems 142a-142n collect 186 sequence states. The application server computer systems 142a-142n also collects 188 incident data and loss data associated with the sequence states, and applies 190 these sequence states to rules that calculate the generated quotation score.

The quotation engine 143 will also at times receive a request for a stored quotation score for a particular premises. If a request is received, the quotation engine 143 will access (not shown) the stored quotation score, encrypt and send the quotation score or send a duplicate of the quotation score to the requesting system (e.g., quotation servers 148a-148n).

In one technique, the application server computer systems 142a-142n collect these sequence states, as well as incident data and loss data associated with the sequences. As discussed above, the application server computer systems 142a-142n includes the quotation engine 143 that uses results from the unsupervised machine learning models to generate the quotation score. This quotation score is a measure of risk for a particular line of insurance or a combination of lines of insurance for a specific premises.

In some implementations, the quotation engine will parse 181a the request to determine the type or types (i.e., lines of insurance requested or required by the request), and will select 181b to evaluate at least those factors pertinent to the determined line of insurance as represented by the state sequences determined above.

Recalling that the Next State Prediction Engine 54 produces sequences and recalling the above fictitious example sequences below, s1 s2 s4 s5
s2 s2 s4 s5 the quotation engine uses the Next State Prediction Engine's 54 determined sequences and the determination that something unusual happened in the premises (incident data and loss data). These sequences are assigned scores over a defined range, e.g., 100 to 1000, or (1 to 100; 400 to 800; A to Z, etc.). One end of the range is assigned as being the highest risk and the other end of the range is assigned as being the lower risk.

With the Next State Prediction Engine 54 that marked state transitions as "safe" or "drift" states transitions and labeled as above, the Next State Prediction Engine 54 also includes entries for incident data and loss data and assigned score. Using 100 to 1000 with 100 being a low risk, another table can be constructed, as shown below (again using fictitious data).

"Y" is used to indicate yellow, e.g., an abnormal or drift state, e.g., an "unsafe state" and "R" is used to indicate that the state resulted in a loss. These data and states are stored in the database 51 and serve as training data for a machine learning model that is part of the quotation engine 143.

A model building processing (not shown but similar to that discussed in FIGS. 5 and 5A) of the quotation Engine 143 uses the above training data to build a model that classifies the system's safe and unsafe states or drifting states into a predicted insured loss. For ease of explanation two states "safe" (also referred to as normal) and "unsafe" (also referred to as drift) are used. The model building processing accesses the training data and applies one or more machine learning algorithms to the training data to produce the model that will execute in the quotation Engine during producing of quotation scores. Machine learning algorithms such as Linear models and Non-Linear Models, Decision tree learning, etc., which are supplemented with Ensemble methods (where two or more models votes are tabulated to form a prediction) and so forth can be used. From this training data and the algorithms, the model is constructed.

Empirical characteristics that can be a model based and human based are determined for various states of the premises in terms of, e.g., safety of the occupants and operational conditions of the various systems within the premises. Examples of such systems include intrusion detection systems, fire alarm systems, public annunciation systems, burglar alarm systems, the sensors deployed at the premises, as well as other types of equipment, such as refrigeration equipment, stoves, and ovens that may be employed in the kitchen example that will be discussed below. Other instances of particular premises will have other types of systems that are monitored. Based on the empirical determined states of the various systems within the premises being monitored, prediction of insured losses in the premises are determined. From these prediction of losses are translated into the score. The translations use rules developed by a company for a particular line of insurance.

Thus, in the example above, where a quotation score is being produced for a restaurant, the existence of the hood fire and the insured loss would raise the risk score according to how hood fires are ranked for restaurants. Thus a generated quotation score that is based on the collected sensor

| Obstruction Detector. | Room Thrmst. | Stove Thrmst. | Safety State | incident | loss | score |
|---|---|---|---|---|---|---|
| 0 | 71.1755732 | 78.95655605 | G | none | none | 100 |
| 0 | 68.27180645 | 79.97821825 | G | none | none | 130 |
| 0 | 71.80483918 | 79.428149 | G | none | none | 100 |
| 0 | 70.46354628 | 81.90901291 | G | none | none | 100 |
| 0 | 69.83508114 | 81.12026772 | G | none | none | 100 |
| 0 | 71.46074066 | 81.613552 | G | none | none | 120 |
| 1 | 70.14174204 | 80.12242015 | G | none | none | 100 |
| 1 | 70.98180652 | 78.03049081 | G | none | none | 100 |
| 0 | 68.58285177 | 79.981358 | G | none | none | 200 |
| 0 | 69.91571802 | 79.4885171 | G | none | none | 100 |
| 1 | 69.89799953 | 79.3838372 | G | none | none | 200 |
| 0 | 70.42668373 | 80.20397118 | G | none | none | 100 |
| 1 | 70.23391637 | 81.80212485 | Y | none | none | 370 |
| 0 | 68.19244768 | 81.19203004 | G | none | none | 100 |
| 0 | 100.1924476 | 200.19203004 | R | hood fire | $10000 | 680 |

The second to last column in the above modified table is the value of the loss for the last entry and the last column is the rating, wherein in this example "G" is used to indicate green, e.g., a normal operating state, e.g., "a safe state" and data will have an assigned score value that is based on expectation of an insured loss due to that state. Over time, as more data are collected, the score value becomes more refined.

The quotation Engine 143 operates in a continuous loop as shown in FIG. 10 to generate new quotation scores from states received from the Next State Prediction Engine 54, as that engine produces predictions from continually monitor the premises/systems looking for transition instances that result in drift in states that indicate potential problem conditions. As the sensors in the premises being monitored operate over a period of time, the state transition matrix, the state time trigger matrix and the state event trigger matrix discussed above are filled by the state representation engine 52 and the Next State Prediction Engine 54 processing 80 improves on predictions and thus also provides more refined quotation scores.

The quotation Engine 143 thus determines an overall score that is based on otherwise existing insurance rate guidelines commonly found in filings with or regulations from state insurance agencies. Over a period of time, the quotation Engine 164 uses the information to construct a mathematical model.

States are produced from the unsupervised learning algorithms (discussed above in FIGS. 5-5B). Overtime, as the analysis determines drift states that correspond to unsafe conditions, the quotation Engine 143 determines a suitable quotation score.

Referring to FIGS. 10A and 10B, as the generated quotation score is received as an encrypted generated quotation score, to be discussed below, the quotation Engine 143 concatenates the determined quotation score with specific pre-quotation characteristic information of the customer that requested the score. The generated quotation score is either encrypted with a suitable encryption algorithm (e.g., Public key algorithms or symmetric key algorithms) alone (FIG. 10A) or the generated quotation score and the concatenated specific pre-quotation characteristic information are encrypted together by an encryption algorithm (e.g., Public key algorithms or symmetric key algorithms) (FIG. 10A). The request for quotation as received includes an address that determines which of the quotation servers 148a-148n the request is intended for. That server (or servers) receive the encrypted quotation score and corresponding key or if not encrypted the server sends a request to quotation score engine 143 on business application sever 142a-142n to confirm that score.

It is noted that the above features address an Internet-centric challenge of alerting a subscriber (client system associated with the premises) to a service (quotation engine that determines a quotation score) with time sensitive information (quotation score) when the subscriber seeks a quotation score (to use with a quotation request) based on actual physical sensor monitoring of a premises for safe/unsafe conditions using integrated security/intrusion/alarm system sensors.

Various combinations of the above described processes are used to implement the features described.

Server computer systems interface to the sensor based state prediction system 50 via a cloud computing configuration and parts of some networks can be run as sub-nets. In some embodiments, the sensors provide in addition to sensor data, detailed additional information that can be used in processing of sensor data evaluate. For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the system. Server computer systems include one or more processing devices (e.g., microprocessors), a network interface and a memory (all not illustrated). Server computer systems may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The server computer systems may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer program product tangibly stored on a non-transient computer readable hardware storage device, the computer program product for forming predictions of something going wrong with a physical object at a physical premises, the computer program product comprising instructions to cause a processor to:
   collect sensor information from plural groups of sensors deployed in a specific premises;
   continually analyze the collected sensor information by executing one or more unsupervised learning models;
   produce operational states of sensor information;
   produce sequences of state transitions from the operational states of the sensor information;
   determine from the sequences of state transitions, normal sensor states and drift sensor states, with respect to the physical object being monitored by the plural groups of sensors, wherein the drift sensor states are indicative of something going wrong with the physical object;
   determine a prediction of something going wrong with the physical object based on the drift sensor states;
   assign scores to the produced sequences;
   determine from the assigned scores a quotation score;
   store the sensor information with the determined quotation score in a persistent storage system; and
   send the prediction and the quotation score to an external system;
   receive a request for a particular line of insurance;
   determine from the particular line of insurance, factors and associated sensor data on which to apply the unsupervised learning models; and
   generate from results of executing the unsupervised machine learning models the quotation score for a particular line of insurance, where the quotation score is a measure of risk for a particular line of insurance.

2. The computer program product of claim 1 further includes instructions to:
   encrypt the quotation score using an encryption key.

3. The computer program produce of claim 1 further includes instructions to:
   encrypt the quotation score using an encryption key;
   receive pre-quotation characteristic information from a user system which identifies a user and a premises for which the quotation score was determined;
   concatenate the pre-quotation characteristic information with the encrypted quotation score.

4. The computer program product of claim 1 further includes instructions to:

concatenate the specific pre-quotation characteristic information and the quotation score; and
encrypt the concatenated specific pre-quotation characteristic information and quotation score using an encryption key.

5. The computer program product of claim 1 wherein the computer program product further comprises instructions to:
receive from a requesting device a request to generate the quotation score; and
transmit the generated quotation score to the requestor device.

6. The computer program product of claim 1 wherein the instructions to analyze further comprise instructions to:
determine from the produced state sequences and quotation score, an updated quotation score.

7. The computer program product of claim 1, wherein the computer program product further comprises instructions to cause the processor to:
determine the quotation score as indicative of an insured loss due to the the prediction associated with the physical object.

8. The computer program product of claim 1, wherein the computer program product further comprises instructions to cause the processor to:
determine the quotation score as a standardized score across many insurance carriers.

9. The system of 1, wherein the sensors comprise smoke detectors or fire detectors.

10. The system of 1, wherein the sensors comprise cameras.

11. A system comprises:
a server computer comprising processor and memory, the server computer coupled to a network;
a storage device storing a computer program product for forming predictions of failure of operation of a physical object at a physical premises, the computer program product comprising instructions to cause the server to:
collect sensor information from plural groups of sensors deployed in a specific premises;
continually analyze the collected sensor information by executing one or more unsupervised learning models;
produce operational states of sensor information;
produce sequences of state transitions from the operational states of sensor information;
determine from the sequences of state transitions, normal sensor states and drift sensor states, with respect to the physical object being monitored by the plural groups of sensors, the drift sensor states are indicative of something going wrong with the physical object;
determine a prediction of something going wrong with the physical object based on the drift sensor states;
assign scores to the produced sequences;
determine from the assigned scores a quotation score;
store the sensor information with the quotation score in a remote persistent storage system; and
send the prediction and the quotation score to an external system;
receive a request for a particular line of insurance;
determine from the particular line of insurance, factors and associated sensor data on which to apply the unsupervised learning models; and
generate from results of executing the unsupervised learning models the quotation score for a particular line of insurance, where the quotation score is a measure of risk for a particular line of insurance.

12. The system of claim 11, further comprising:
encrypt the quotation score using an encryption key.

13. The system of claim 11, further comprising:
encrypt the quotation score using an encryption key;
receive pre-quotation characteristic information from a user system which identifies a user and a premises for which the quotation score was determined;
concatenate the pre-quotation characteristic information with the encrypted quotation score.

14. The system of claim 11, further comprising:
concatenate the specific pre-quotation characteristic information and the quotation score; and
encrypt the concatenated specific pre-quotation characteristic information and quotation score using an encryption key.

15. The system of claim 11, further comprising:
receive from a requesting device a request to generate the quotation score; and
transmit the generated quotation score to the requestor device.

16. The system of claim 11, further comprising:
determine from the produced state sequences and quotation score, an updated quotation score.

17. The system of claim 11, further comprising:
determine the quotation score as indicative of an insured loss due to of the prediction associated with the physical object.

18. The system of claim 11, further comprising:
determine the quotation score as a standardized score across many insurance carriers.

19. The system of 9, wherein the sensors comprise smoke detectors or fire detectors.

20. The system of 9, wherein the sensors comprise cameras.

* * * * *